(12) United States Patent
Tsukuda et al.

(10) Patent No.: US 11,544,601 B2
(45) Date of Patent: Jan. 3, 2023

(54) SYSTEM FOR GENERATING TOPIC INFERENCE INFORMATION OF LYRICS

(71) Applicant: National Institute of Advanced Industrial Science and Technology, Tokyo (JP)

(72) Inventors: Kosetsu Tsukuda, Tsukuba (JP); Masataka Goto, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 659 days.

(21) Appl. No.: 16/485,936

(22) PCT Filed: Feb. 15, 2018

(86) PCT No.: PCT/JP2018/005227
§ 371 (c)(1),
(2) Date: Aug. 14, 2019

(87) PCT Pub. No.: WO2018/151203
PCT Pub. Date: Aug. 23, 2018

(65) Prior Publication Data
US 2020/0034735 A1 Jan. 30, 2020

(30) Foreign Application Priority Data
Feb. 15, 2017 (JP) .............................. JP2017-026196

(51) Int. Cl.
*G06N 5/04* (2006.01)
*G06N 20/00* (2019.01)
(Continued)

(52) U.S. Cl.
CPC ............. *G06N 5/041* (2013.01); *G06F 40/30* (2020.01); *G06N 7/005* (2013.01); *G06N 20/00* (2019.01)

(58) Field of Classification Search
None
See application file for complete search history.

(56) References Cited

U.S. PATENT DOCUMENTS

| 10,276,189 B1* | 4/2019 | Brochu ................ G06V 30/194 |
| 2017/0091322 A1* | 3/2017 | Agrawal ........... G06F 16/90324 |
| 2019/0066641 A1* | 2/2019 | Nazer .................. G10H 1/0008 |

OTHER PUBLICATIONS

Blei, et al., "Latent Dirichlet Allocation", Journal of Machine Learning Research (2003) pp. 993-1022, Submitted Feb. 2002; Published Jan. 2003, 30 pages.
(Continued)

*Primary Examiner* — Anh Nguyen
(74) *Attorney, Agent, or Firm* — Rankin, Hill & Clark LLP

(57) ABSTRACT

A system for generating topic inference information of lyrics that can provide more useful for topic interpretation of lyrics. A device for learning topic numbers performs an operation of updating and learning topic numbers, which performs an operation of updating topic numbers on all of a plurality of lyrics data of each of a plurality of artists, for a predetermined number of times. The operation of updating topic numbers updates the topic number assigned to a given lyrics data of a given artist using a random number generator having a deviation of appearance probability corresponding to a probability distribution over topic numbers. An outputting device outputs the topic numbers of the plurality of lyrics data for each of the plurality artists, and a probability distribution over words for each of the topic numbers.

16 Claims, 23 Drawing Sheets

(51) Int. Cl.
  *G06F 40/30* (2020.01)
  *G06N 7/00* (2006.01)

(56) References Cited

OTHER PUBLICATIONS

Kleedorfer, et al., "Oh, Oh, Oh, Woah! Towards Automatic Topic Detection in Song Lyrics", In Proceedings of ISMIR 2008, Session 2d—Social and Music Networks, pp. 287-292, 6 pages.
Tokai, et al., "A Music Recommendation System based on Users' Behavior", IPSJ SIG Technical Report, vol. 2016-MUS-110 No. 9, 2016, pp. 1-5, 5 pages.
Hirai, et al., "Automation of DJ Play Based on Beat Similarity of Music and Similarity of Latent Topics", IPSJ SIG Technical Report, vol. 2015-MUS-108 No. 14, 2015, pp. 1-8, 8 pages.
Sasaki, et al., "LyricsRadar: A Lyrics Retrieval Interface Based on Latent Topics of Lyrics", IPSJ Journal, vol. 57, No. 5, 2016, pp. 1365-1374, 10 pages.
Watanabe, et al. Proceedings of the 77th National Convention of IPSJ, (2) Artificial Intelligence and Cognitive Science, "Modeling of Latent Topic Transitions from Large Scale Lyrics Data", Mar. 17, 2015, pp. 2-371, 2-372, 2 pages.
Kikuchi, et al., "A Study on Scene Presumption of Music Based on Lyrics Using PMM", Proceedings of the IEICE General Conference 2011, Information and Systems 1, 42 pages.
International Search Report, International Application No. PCT/JP2018/005227, dated May 15, 2018, 2 pages.

\* cited by examiner

→ Hiroshi Sekiya / Modoranai Natsu (not returning summer) / Yugure (evening) (Topic)

FIG.14A
Word Probability Distribution for each topic number
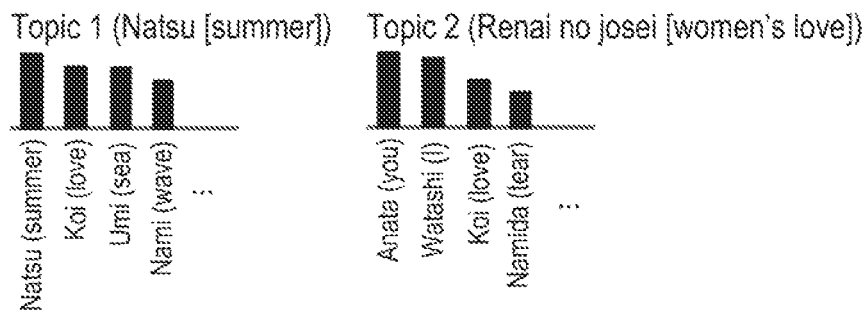
FIG.14B
Topic Number for Each Artist
Hiroshi Sekiya
Modoranai Natsu (not returning summer): Topic 1
Shodobutsu (small animal): Topic 1
Sekai no Mikata (global viewpoint): Topic 3
Hiromi Yoshii
Game of Love: Topoic 2
Anata to aete (meeting you): Topic 2
Hitoyo no Yume (one night dream): Topic 20

FIG.19A

Topic 17 (Positive)

| Word | Occurrence Probability |
|---|---|
| Kimi (you) | 0.0661 |
| Yume (dream) | 0.0269 |
| Boku (I) | 0.0235 |
| Ima (now) | 0.0234 |
| Ashita (tomorrow) | 0.0190 |
| Sora (sky) | 0.0189 |
| Mirai (future) | 0.0177 |
| Bokura (we) | 0.0173 |
| Te (hand) | 0.0170 |
| Kokoro (heart) | 0.0167 |
| Nani (what) | 0.0166 |
| ⋮ | |

FIG.19B

Topic 19 (Adult women's love)

| Word | Occurrence Probability |
|---|---|
| Anata (you) | 0.0453 |
| Watashi (I) | 0.0260 |
| Hito (person) | 0.0218 |
| Koi (love) | 0.0172 |
| Yume (dream) | 0.0161 |
| Kokoro (heart) | 0.0144 |
| Ai (love) | 0.0130 |
| Kaze (wind) | 0.0115 |
| Yoru (night) | 0.0110 |
| Ni (two) | 0.00994 |
| Kimi (you) | 0.00988 |
| ⋮ | |

FIG.19C

Background

| Word | Occurrence Probability |
|---|---|
| Nani (what) | 0.0146 |
| Me (eyes) | 0.0102 |
| Boku (I) | 0.00869 |
| Naka (inside) | 0.00747 |
| Mae (before) | 0.00625 |
| Sekai (world) | 0.00582 |
| Hi (day) | 0.00573 |
| Te (hand) | 0.00506 |
| Kyo (today) | 0.00486 |
| Machi (town) | 0.00428 |
| Mitai (seem) | 0.00405 |
| ⋮ | |

FIG.20A

Artist A

| Word | Occurrence Probability |
|---|---|
| Natsu (summer) | 0.0643 |
| Boku (I) | 0.0407 |
| Kimi (you) | 0.0378 |
| Koi (love) | 0.0334 |
| Mune (Chest) | 0.0315 |
| Yume (dream) | 0.0302 |
| Namida (tear) | 0.0287 |
| Kokoro (heart) | 0.0281 |
| Dare (who) | 0.0274 |
| Umi (sea) | 0.0180 |
| Omoide (memory) | 0.0177 |
| ⋮ | |

FIG.20B

Artist B

| Word | Occurrence Probability |
|---|---|
| Anata (you) | 0.148 |
| Watashi (I) | 0.0886 |
| Hito (person) | 0.0484 |
| Ni (two) | 0.0420 |
| Ai (love) | 0.0379 |
| Kokoro (heart) | 0.0227 |
| Sekai (world) | 0.0227 |
| Kimochi (feeling) | 0.0222 |
| Subete (all) | 0.0198 |
| Te (hand) | 0.0140 |
| Shiawase (happiness) | 0.0140 |
| ⋮ | |

FIG.22A
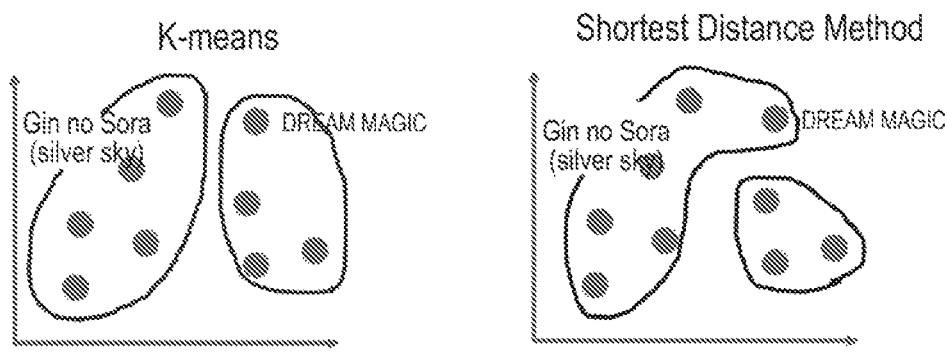
FIG.22B
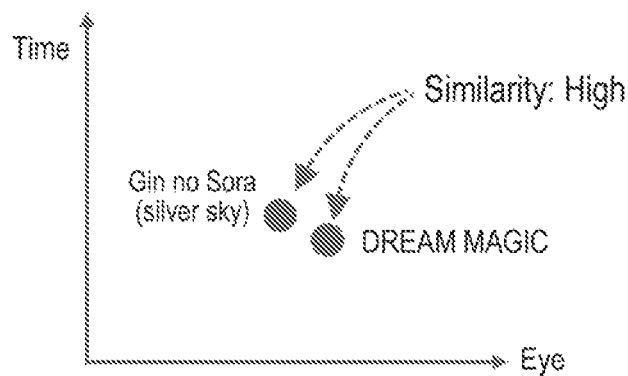
FIG.22C

SYSTEM FOR GENERATING TOPIC INFERENCE INFORMATION OF LYRICS

TECHNICAL FIELD

The present invention relates to a system for generating topic inference information of lyrics.

BACKGROUND ART

A topic of lyrics refers to a subject, a main point, or a theme of lyrics. If topics of lyrics can reliably be inferred, it will be possible to automatically grasp a given artist's topic taste appearing in the lyrics of the artist's songs and to find and make recommendations of an artist who has a similar topic taste of lyrics to the given artist.

Conventionally, the LDA (Latent Dirichlet Allocation) (refer to Non-patent Document 1) and a technique called as clustering method have been used to infer topics of lyrics.

RELATED ART DOCUMENTS

Non-Patent Documents

Non-patent Document 1: D. M. Blei, A. Y. Ng, and M. I. Jordan, "Latent Dirichlet Allocation", The Journal of Machine Learning Research, 2003, pp. 993-1022.

Non-patent Document 2: F. Kleedorfer, P. Knees, and T. Pohle, "Oh, Oh, Oh, Woah! Towards Automatic Topic Detection in Song Lyrics", In Proceedings of ISMIR 2008, 2008, pp. 287-292.

SUMMARY OF INVENTION

Technical Problems

As illustrated in FIG. 21A, a topic is assigned to each word of lyrics, but is not assigned to the entire lyrics in the LDA. As illustrated in FIG. 21B, a topic distribution for each of artists is not modelled in the LDA. Further, as illustrated in FIG. 21C, since the LDA does not take account of so-called background words in the lyrics, there is a possibility in each topic that an occurrence probability of words unrelated to the topic may be high.

As illustrated in FIG. 22A, a topic is determined, based on the number of times that a word appears in lyrics and whether or not the word is present in the lyrics in the clustering method. Since mathematical validity is not obvious, it is necessary to determine the topic on a trial and error basis. As illustrated in FIG. 22B, it is also necessary to try various mathematical techniques for clustering words. Further, as illustrated in FIG. 22C, since the clustering method does not take so-called background words in the lyrics into consideration, words having low relevance with each topic are included in computing similarities. There is a possibility that the similarity between the lyrics may be high due to the effect of words unrelated to the topic.

In these conventional techniques, it is common to assign one topic to each word when analyzing meanings of lyrics and accordingly it is difficult to interpret the lyrics. Further, an estimator is constructed for an artist who has few lyrics in the same manner as an artist who has a sufficient number of lyrics, thereby deteriorating the performance of analysis of lyrics meanings.

An object of the present invention is to provide a system for generating topic inference information of lyrics that can obtain a topic distribution for each artist with mathematical validity, and accordingly to provide valid information more useful for topic interpretation of lyrics than ever.

A further object of the present invention is to provide a system for topic inference information of lyrics that can suppress increased occurrence probabilities of words unrelated to each topic by taking account of background words in the lyrics.

When the present invention is implemented as a method invention or a computer program invention, an object of the invention is to provide a method or a computer program for generating topic inference information of lyrics that can obtain a topic distribution for each artist with mathematical validity and provide valid information more useful for topic interpretation of the lyrics than ever.

When the present invention is implemented as a method invention or a computer program invention, a further object of the invention is to provide a method or a computer program for generating topic inference information of lyrics that can suppress increased occurrence probabilities of words unrelated to each topic by taking account of background words in the lyrics.

Solution to Problems

The present invention is directed to a system for generating topic inference information of lyrics that is capable of obtaining reliable information for inferring a topic that is a subject, a main point or a theme of lyrics as determined by lyric contents. The system of the present invention comprises a means for obtaining lyrics data, a means for generating a given number of topic numbers, an analysis means, a means for learning topic numbers, and an outputting means. The means for obtaining lyrics data is operable to obtain a plurality of lyrics data each including a song name and the lyrics for each of a plurality of artists. The means for generating a given number of topic numbers k ($1 \leq k \leq K$) where k is a number in a range of 1 to K (a positive integer). The analysis means is operable to extract a plurality of words by performing morpheme analysis of a plurality of lyrics in a plurality of the lyrics data, using a morpheme analysis engine.

The means for learning topic numbers is operable to perform an operation of updating and learning topic numbers for a predetermined number of times. The operation of updating and learning topic numbers performs an operation of updating topic numbers on all of the plurality of lyrics data for each of the plurality of artists. In the operation of updating topic numbers, a topic number is first assigned to each of the plurality lyrics data for each of the plurality of artists in a random or arbitrary manner. Then, a probability p that the topic number for a given lyrics data $S_{ar}$ is k is calculated, based on the number $R_{ak}$ of lyrics data other than a lyrics data $S_{ar}$ for a given artist a to which the topic number k is assigned and the number $N_{kv}$ of times that the topic number k is assigned to the word v in the plurality of lyrics data for the plurality of artists except the given lyrics data $S_{ar}$. Then, a probability distribution over topic numbers of the given lyrics data $S_{ar}$ is generated, based on the calculated probability p. Next, an operation of updating topic numbers is performed to update the topic number assigned to the given lyrics data $S_{ar}$ of the given artist using a random number generator having a deviation of appearance probability corresponding to the probability distribution over topic numbers. The outputting means is operable to identify the topic number of each of the plurality of lyrics data and the probability distributions over words are generated for each of the topic numbers, based on learning results obtained from the means for learning topic numbers.

In the outputting means, the topic number of each of the plurality of lyrics data is a topic number that is last assigned to each of the plurality of lyrics data after the operation of updating and learning topic numbers is performed for a predetermined number of times in the means for learning topic numbers. With this, namely, by outputting the last assignment result, an appropriate topic number can be assigned to each of the plurality of lyrics data.

The means for obtaining lyrics data obtains a plurality of lyrics data for each of the plurality of artists, and the outputting means identifies the topic numbers of the plurality of lyrics data of each of the plurality of artists and probability distributions over words for each of the plurality of topics. With this, the topics of the lyrics in the plurality of songs of each of the plurality of artists can be considered as reflecting the artists' personalities. Thus, it is possible to provide artist-based song information to a person who chooses a song.

The morpheme analysis is performed using a morpheme analysis engine operable to extract nouns or a group of parts of speech as words. Various morpheme engines have currently been proposed. With a morpheme engine, it is possible to extract even a considerable amount of songs.

According to the present invention, once an arbitrary number of topics are determined, the topic numbers of each of the plurality of lyrics data are identified with the topic numbers of each of the plurality of lyrics data of each of the plurality of artists that have been last updated by the means for learning topic numbers. Once the topic numbers of each of the plurality of lyrics data are identified, a probability distribution over words for each of the identified topic numbers is accordingly identified. This eliminates the need of manually specifying a group of words related to the topic and a group of words unrelated to the topic. Once a plurality of words having a high occurrence probability are identified, it is possible to obtain reliable information for capturing the topics from the identified words, thereby grasping a likely meaning of the topic for each of lyrics.

In the means for learning topic numbers, it is preferably assumed that topic numbers assigned to all of the plurality of lyrics but the topic number assigned to a given lyrics data of a given artist are correct when generating the probability distribution over topic numbers. Specifically, first, a first probability $p_1$ that the topic number of the given lyrics data $S_{ar}$ is k is calculated, based on the number $R_{ak}$ of lyrics data to which the topic number k is assigned other than the given lyrics data $S_{ar}$ of the given artist a. Next, a second probability $p_2$ that the topic number of the given lyrics data $S_{ar}$ is k is calculated, based on the number $N_{kv}$ of times that the topic number k is assigned to a word v in the plurality of lyrics data of the plurality of artists other than the given lyrics data $S_{ar}$. Further, the probability p that the topic number of the given lyrics data $S_{ar}$ is k is calculated from the first probability $p_1$ and the second probability $p_2$. Then, a probability distribution over topic numbers of the given lyrics data $S_{ar}$ is determined by performing the above-mentioned calculations on all of the topic numbers and normalizing the probabilities that the topic number of the given lyrics data $S_{ar}$ is any one of 1 to K such that normalized probabilities sum up to 1 (one). These calculations increase accuracy of the topic number distributions.

The outputting means is preferably configured to output a probability distribution over words for each topic number, based on the number $N_{kv}$ of times that the topic number k is assigned to a given word v. In the outputting means, an occurrence probability $\theta_{kv}$ of the word v to which the topic number k is assigned is calculated as follows:

$$\theta_{kv}=(N_{kv}+\beta)/(N_k+\beta|V|)$$

where $N_{kv}$ denotes the number of times that a topic number k is assigned to a given word v, $N_k$ denotes the number of all of words to which the topic number k is assigned, $\beta$ denotes a smoothing parameter, and $|V|$ denotes the number of kinds of words.

In the present invention, the system may further comprise a means for learning values of switch variables. The means for learning values of switch variables performs an operation of updating and learning values of switch variables for a predetermined number of times. The operation of updating and learning values of switch variables performs an operation of updating values of switch variables on all of a plurality of words included in a plurality of lyrics data for each of a plurality of artists. The operation of updating values of switch variables updates values of switch variables. Here, in the operation of updating values of switch variables, values are assigned to the plurality of words included in the plurality of lyrics data of each of the plurality of artists in a random or arbitrary manner. After that, a probability distribution $\lambda_a$ over values of switch variables is generated by calculating a probability whether a value of the switch variable x assigned to a given word $v_{arj}$ is a topic word (x=0) or a background word (x=1), based on values of the switch variables assigned to the plurality of words in the plurality of lyrics data of the given artist a. Next, the value of the switch variable assigned to the given word is updated, using a random number generator having a deviation of appearance probability corresponding to the probability distribution over values of the switch variables.

Learning by the means for learning values of switch variables may be performed before or after the learning performed by the means for learning topic numbers. When the means for learning values of switch variables is provided, inference accuracy of the topic number will be increased, compared with when the means for learning values of switch variables is not provided. This is because it is taken into consideration whether a given word is a topic word or a background word. With the values of switch variables taken into consideration, the topic numbers of a plurality of lyrics data and the occurrence probability of words for each topic number are captured. This decreases occurrence probabilities of words weakly related to the topics (background words) and thereby reduces the effect of the background words when inferring the topic number of lyrics.

The switch variable refers to a variable for inferring whether a given word is related to the subject of an assumed topic. The switch variables can be identified by computing, which eliminates the need of manually specifying a group of words related to the topic and a group of words unrelated to the topic.

In the means for learning values of switch variables, it is preferably assumed that values of switch variables assigned to all of words other than the value of the switch variable x assigned to the given word in the plurality of words of the given lyrics data of the given artist are correct when performing an operation of updating the values of switch variables. Specifically, the means for learning values of switch variables performs the following calculations. First, a third probability $p_3$ that a value of the switch variable for the word $v_{arj}$ is 0 (zero) is calculated, based on a number $N_{a0}$ of words to which a value of 0 (zero) is assigned as the value of the switch variable in all of lyric data of all of songs for the given artist a. Next, a fourth probability $p_4$ that the value of the switch variable of the word $v_{arj}$ is 0 (zero) is calculated, based on a number $Nz_{ar}v_{arj}$ of times that 0 (zero) is assigned to the value of the switch variable of the word $v_{arj}$ in all of sons of all of artists to which the same topic number $Z_{ar}$ as the lyrics including the word $v_{arj}$ is assigned. Then, a fifth probability $p_5$ that the value of the switch variable is 0 (zero) is calculated from the third probability $p_3$ and the fourth probability $p_4$. Further, a sixth probability $p_6$ that the value of the switch variable for the word $v_{arj}$ is 1 (one) is calculated, based on a number $N_{a1}$ of times that 1 (one) is assigned as the value of the switch variable in the plurality lyrics data of the given artist. Next, a seventh probability $p_7$ that the value of the switch variable for the word $v_{arj}$ is 1 (one) is calculated, based on a number $N_{1varj}$ of times that 1 (one) is assigned as the value of the switch variable for the word $v_{arj}$ in the plurality of lyrics data of the plurality of artists. Then, an eighth probability $p_8$ that the value of the switch variable is 1 (one) is calculated from the sixth probability $p_6$ and the seventh probability $p_7$. Probabilities are normalized from the fifth probability $p_5$ and the eighth probability $p_8$ such that a sum of the probability that the value of the switch variable for the word $v_{arj}$ is 0 (zero) and the probability that the value of the switch variable for the word $v_{arj}$ is (1) one is 1 (one). Finally, the normalized probability distribution is determined as the probability distribution over switch variables. The probability distribution thus obtained is the result from taking account of the ratio of whether the values of the switch variables are 0 (zero) or 1 (one) in all of the lyrics data of the given artist a, and ratio of whether the values of the switch variables for the words $v_{arj}$ are 0 (zero) or 1 (one) in all of the lyrics data of all of the artists.

When obtaining a topic number of lyrics data of anew song of a given artist that has not been used in learning, the system may be configured as follows. The system further comprises a first means for generating a word probability distribution, operable to generate a probability distribution over words included in lyrics data of a new song s of a given artist that has not been used in learning; a second means for generating a word probability distributions included respectively in lyrics data of a plurality of songs of a plurality of artists; a means for computing similarities operable to obtain cosine similarities or similarities according to an arbitrary scale respectively between the probability distribution over words included in the lyrics data of the new song s as calculated by the first means for generating a word probability distribution and the probability distributions over words included in the lyrics data of the plurality of songs as calculated by the second means for generating word probability distributions; and a means for generating a weight distribution by adding the similarities of the lyrics data of the plurality of songs corresponding to the lyrics data of the plurality of songs to the topic numbers as a weight. Then, a topic number having the largest weight is determined as a topic number of the lyrics data of the new song s.

In order to obtain further information for determining a topic of lyrics data of the new song s of the given artist that has not been used in learning, the system may further comprise a third to fifth means for generating a word probability distribution, a means for computing similarities, and a means for generating an occurrence probability. The third means for generating a word probability distribution generates a distribution over words included in the lyric data of all of songs of the artist that has not been used in learning and for which an occurrence probability of background words are to be calculated. The fourth means for generating a word probability distribution generates probability distributions over words in the lyrics data of all of the songs of each of the artists that have been used in learning. The fifth means for generating a word probability distribution generates a probability distribution over background words included in the lyrics data of all of the songs for each of the artists that have been used in learning. The means for computing similarities computes cosine similarities or similarities according to an arbitrary scale respectively between the probability distribution over words included in the lyrics data of the new song s as calculated by the third means for generating a word probability and the probability distributions over words included in the lyrics data of the plurality of songs as calculated by the fourth means for generating word probability distributions. The means for generating an occurrence probability distribution over background words obtains an occurrence probability of background words, based on the similarity for each of the artists as computed by the means for computing similarities and the probability distribution over background words included in the lyrics data of all of the songs of each of the artists as computed by the fifth mans for generating word probability distributions. Specifically, the probability distributions over background words included in the lyrics data of all of the songs of each of the artists are multiplied by the respective similarities. Then, the probability distributions thus obtained are normalized for each of the artists such that the probability distributions sum up so that the sum of weights becomes 1 (one). Thus, the occurrence probability distribution is determined for background words. From the occurrence probability distribution thus obtained by the means for computing an occurrence probability, the meaning of a topic can be grasped.

In another aspect, the present invention may be implemented as a method for generating topic inference information of lyrics as follow. In the step of obtaining lyrics data, a plurality of lyric data each including a song name and lyrics are obtained for each of a plurality of artists. In the step of generating topic numbers, a given number of topic numbers are generated where the topic number k ($1 \leq k \leq K$) is in a range of 1 to K (a positive integer). In the analysis step, a plurality of lyrics in a plurality of lyrics data are analyzed by means of morpheme analysis to extract a plurality of words. In the step of learning topic numbers, first, a topic number is assigned to each of the plurality of lyrics dada of each of the plurality of artists in a random or arbitrary manner. Next, a probability p that the topic number of a given lyrics data is k is calculated, based on a number $R_{ak}$ of lyrics data all but a lyrics data $S_{ar}$ of a given artist a to which the topic number k is assigned and a number $N_{kv}$ of times that the topic number k is assigned to the word v in the plurality of lyrics data of all the plurality of artists but the given lyrics data $S_{ar}$. From this probability, a probability distribution over topic numbers of the given lyrics data $S_{ar}$ is generated. Next, an operation of updating topic numbers is performed to update the topic number assigned to the given lyrics data $S_{ar}$ of the given artist, using a random number generator having a deviation of appearance probability corresponding to the probability distribution over topic numbers. Thus, an operation of updating and learning topic numbers is performed for a predetermined number of times. The operating of updating and learning topic numbers performs the operation of updating topic numbers on all of the plurality of lyrics data of each of the plurality of artists. Then, in the outputting step, the topic number of each of the plurality of lyrics data and the probability distributions over words for each of the topic numbers are identified, based on learning results in the step of learning topic numbers.

In a further aspect, the present invention may be implemented as a computer program for generating topic inference information of lyrics when implementing each step of the method for generating topic inference information of lyrics on a computer. The computer program is preferably recorded in a computer-readable medium.

BRIEF DESCRIPTION OF DRAWINGS

FIG. 14A illustrates example occurrence probabilities of words for each of a plurality of topics; and FIG. 14B illustrates example identifications over topic numbers of each of a plurality of lyrics data of each of a plurality of artists.

FIGS. 19A and 19B illustrate example word probability distributions for each of the topics obtained in the embodiments of the present invention; and FIG. 19C illustrates an example word probability distribution over background words.

FIGS. 20A and 20B respectively illustrate an example occurrence probability distribution over background words of a song for each artist.

FIGS. 22A to 22C are used to explain problems when using a clustering method to infer topics of lyrics.

DESCRIPTION OF EMBODIMENTS

Now, embodiments of the present invention will be described below in detail with reference to accompanying drawings.

First Embodiment

Figure 1:
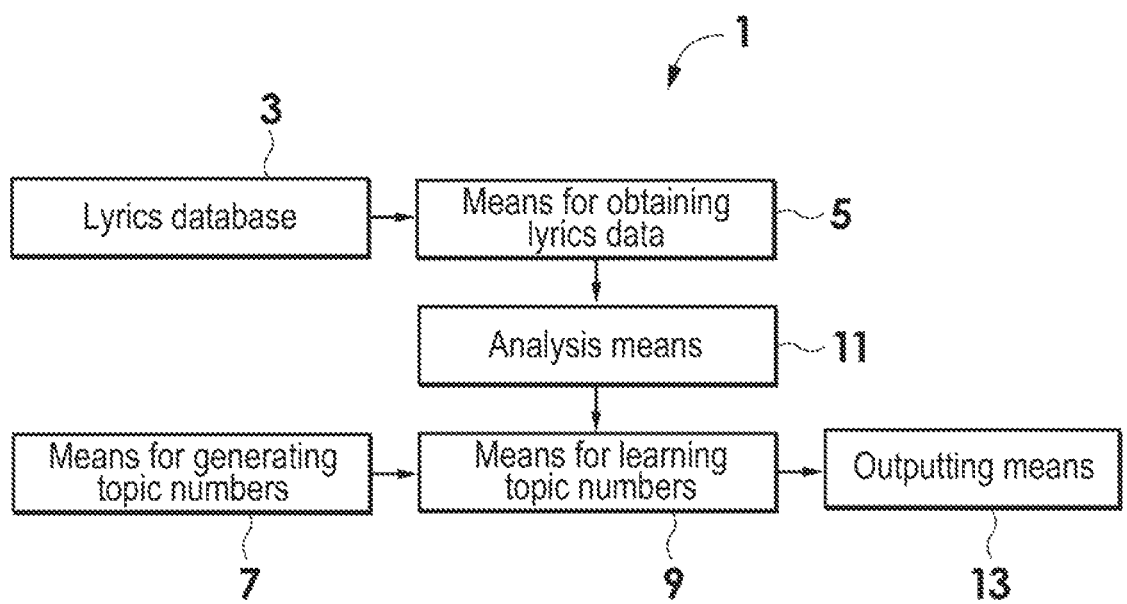
FIG. 1 is a block diagram illustrating a first embodiment of a system for generating topic inference information of lyrics according to the present invention.
Figure 2:
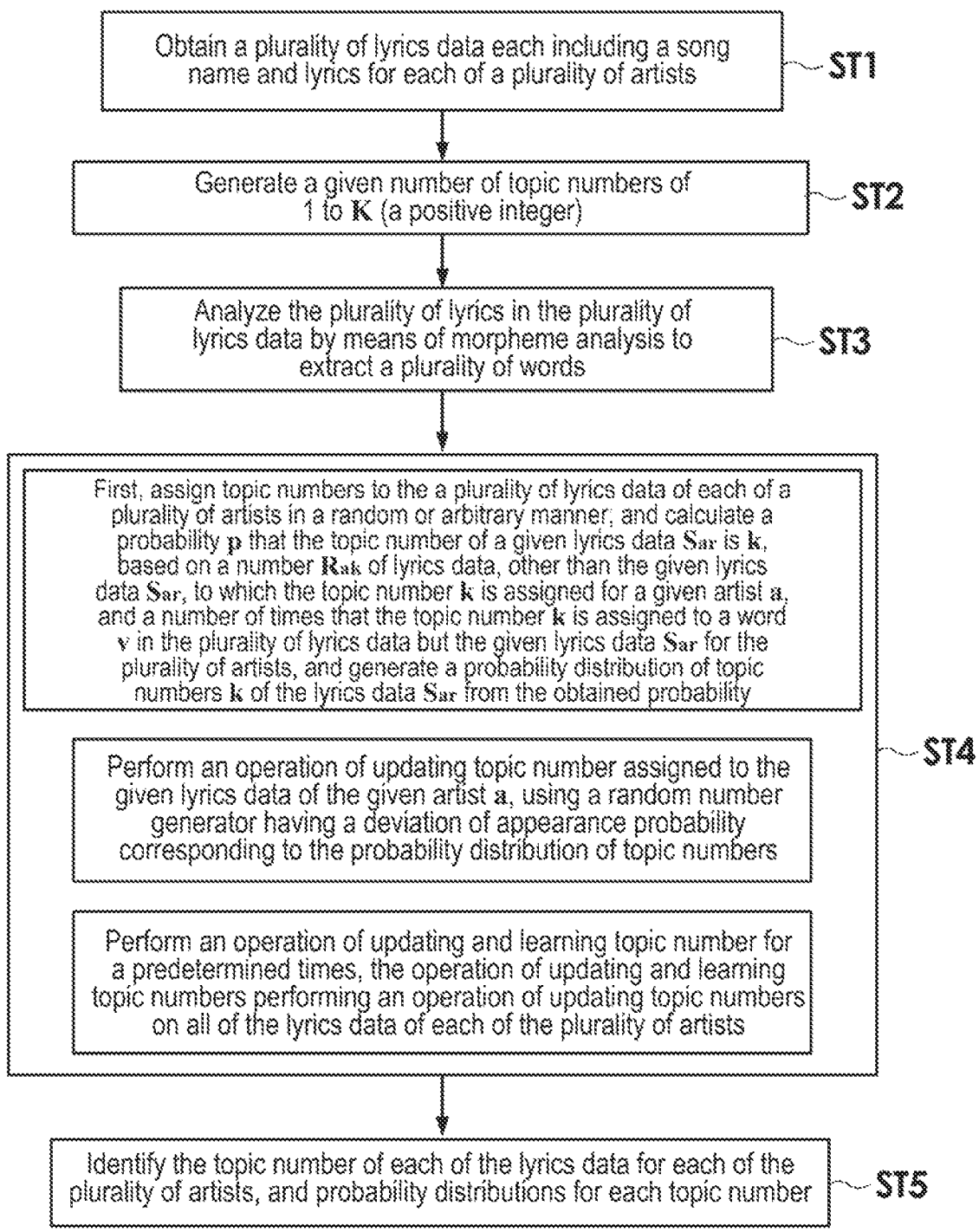
FIG. 2 is a flowchart illustrating an example algorithm of a computer program when implementing the system of the first embodiment of the present invention on a computer.

FIG. 1 is a block diagram illustrating a first embodiment of a system for generating topic inference information of lyrics according to the present invention. Each block of the illustrated embodiment is implemented on a computer by a computer program installed in the computer, or are implemented by a plurality of processors and a plurality of memories. FIG. 2 is a flowchart illustrating an example algorithm of a method for generating topic inference information of lyrics and a computer program when implementing a basic configuration of the system of the first embodiment using a computer.

As illustrated in FIG. 1, a system 1 for generating topic inference information of lyrics as a basis of the first embodiment comprises a lyrics database 3, a means 5 for obtaining lyrics data, a means 7 for generating topic numbers, a means 9 for learning topic numbers, an analysis means 11, and an outputting means 13.

Figure 3:
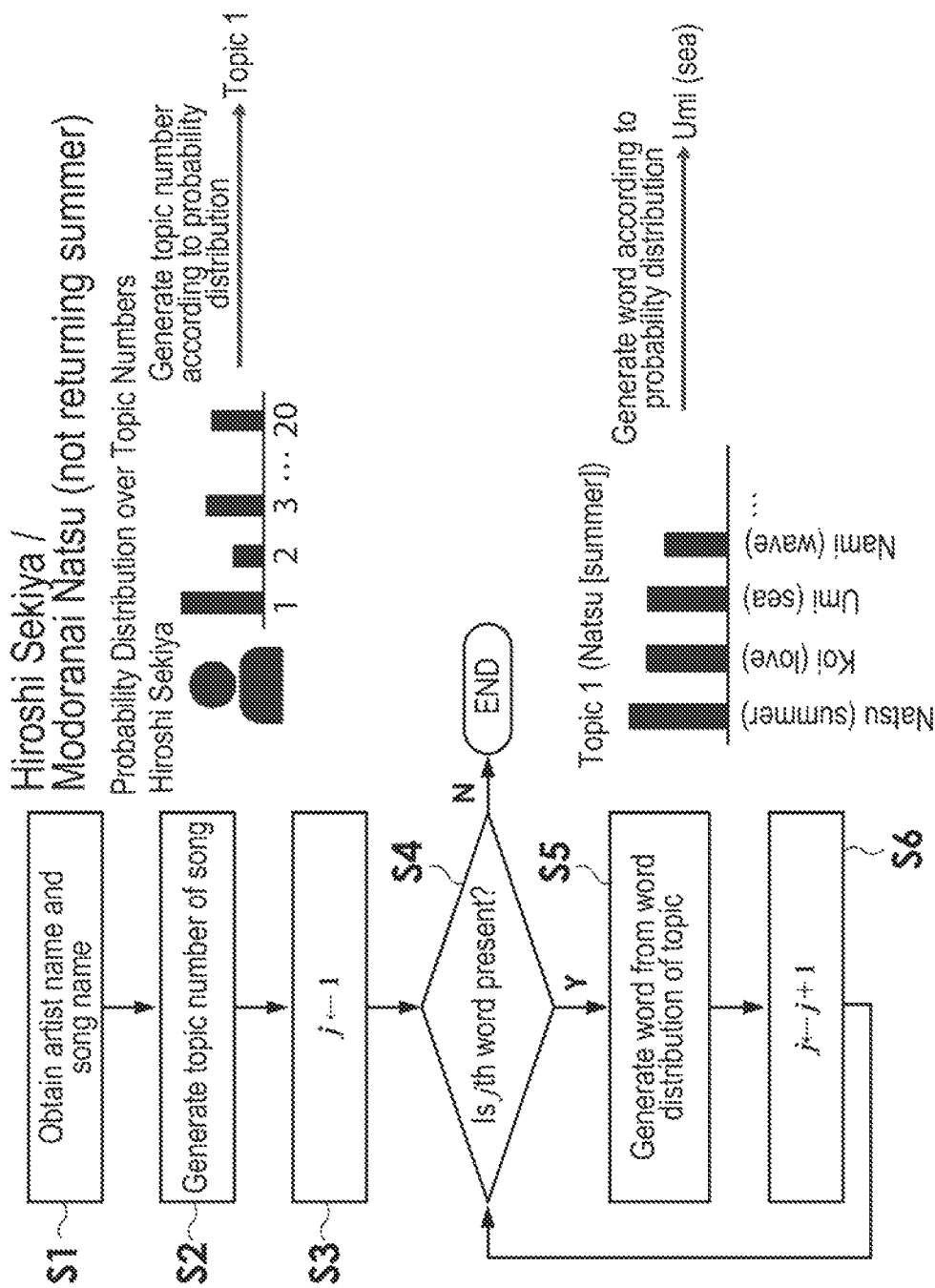
FIG. 3 is used for explaining a model for a lyrics generative process.

In the present invention, structural elements as illustrated as a block in FIG. 1 are employed, based on a lyrics generative process as modeled from the lyrics generative process illustrated in FIG. 3. Here, a model of lyrics generative process illustrated in FIG. 3 is described first. When generating lyrics, an artist and a song are chosen at step S1. For example, an artist is "Hiroshi Sekiya" and a song is "Modoranai Natsu (not returning summer)". Next, a topic number of the song is generated (step S2). Here, the topic refers to a subject, a main point, or a theme of lyrics as determined by the contents of the lyrics. For example, "Natsu (summer)", "Josei no Koiuta (love song for women)", "Tabi (journey)", etc. "A topic number" is assigned to the topic when classifying topics into groups. In the first embodiment, "the topic number" is simply a number and does not have a meaning. Roughly assuming that the topics of lyrics of artists' songs are grouped into 20 kinds (a plurality of kinds of lyrics are classified into 20 groups, for example), the topic number is a number of 1 to 20. The lyrics of a plurality of songs of a given artist are grouped into some kinds of topics, and a number is assigned to each topic. Then, an occurrence probability is calculated for each topic number. This is a probability distribution over topic numbers. Next, a word is sequentially generated from the word probability distribution of the topic when identifying the jth word in the lyrics (steps S4 to S5). Once the jth word is identified, then the j+1th word will be identified. When all the words are identified, lyrics generation is completed.

Now, the theories used in implementing the first embodiment on hardware such as a computer will be described using mathematical equations and expressions. The model is represented by the following equation. Here, the number of topics given as an input is K, a collection of artists in the collection of lyrics data is A, and a collection of nouns or given parts of speech is V. The topic k (1≤k≤K) has a word probability distribution $\varphi k=(\varphi_{k1}, \varphi_{k2}, \ldots, \varphi_{kV})$, and an occurrence probability of a word v∈V is $\varphi_{kv} \geq 0$ and satisfies the following equation.

$$\Sigma_{v=1}^{|V|}\varphi_{kv}=1$$

An artist a∈A has a topic probability distribution $\theta a=(\theta a_1, \theta a_2, \ldots, \theta a_k)$, and a topic occurrence probability $\theta a \geq 0$ and satisfies the following equation.

$$\Sigma_{k=1}^{K}\theta_{ak}=1$$

The artist a∈A has a probability distribution $\lambda a=(\lambda a_0; \lambda a_1)$ for choosing a value of the switch variable. $\lambda a_0$ is a probability having a value of the switch variable of 0 (zero), and indicates that a word is chosen from the topics. $\lambda a_1$ is a probability having a value of the switch variable of 1 (one), and indicates that a word is chosen from the background words. $\lambda a_0 \geq 0$ and $\lambda a_1 \geq 0$ and $\lambda a_0 + \lambda a_1 = 1$ are satisfied. The background word v∈V has a word probability distribution $\varphi=\varphi_1, \varphi_2, \ldots \varphi_{|V|}$), and a word occurrence probability $\varphi_V \geq 0$ and satisfies the following equation.

$$\Sigma_{v=1}^{|V|}\psi_v=1$$

Figure 4:
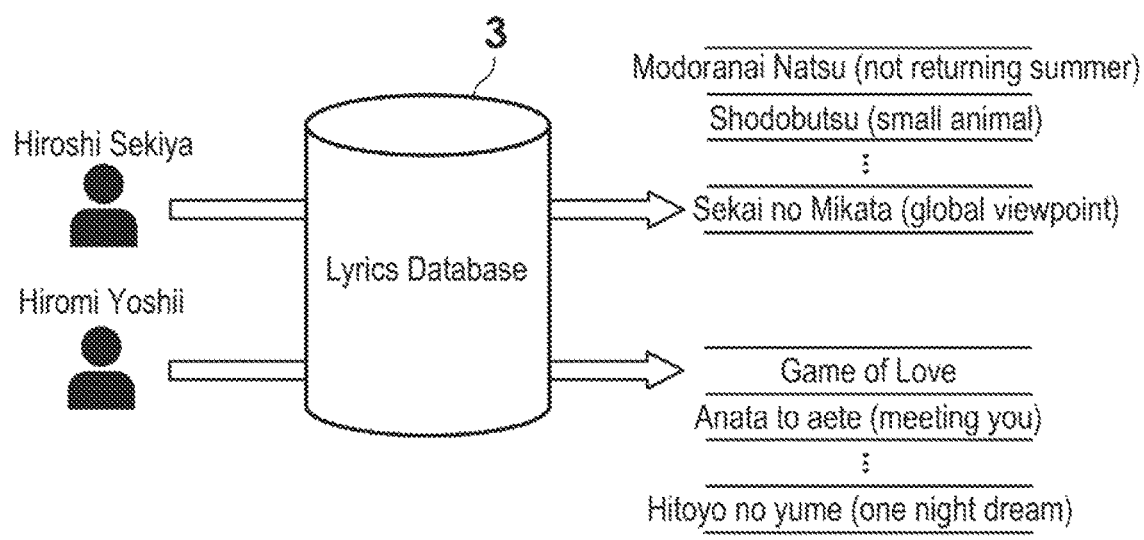
FIG. 4 illustrates how songs are collected for each of artists.

The system of the present invention automatically generates information useful for determining or inferring the topics of lyrics, based on the model illustrated in FIG. 3. The means 5 for obtaining lyrics data obtains a plurality of lyrics data (a collection of lyrics data) including song names and lyrics for each of a plurality of artists from a lyric database 3, as illustrated in step ST1 of FIG. 2 and FIG. 4. In an example of FIG. 4, the means for obtaining lyrics data obtains respective lyrics data of songs of two artists (Hiroshi Sekiya and Hiromi Yoshii). As the database 3, for example, MySQL may be used.

To implement this using a computer, the total number of lyrics data of an artist a is defined as $R_a$, and the r(1≤r≤$R_a$)th lyric as $S_{ar}$, a collection $D_a$ of lyrics of the artist a is represented by the following equation.

$$D_a=\{S_{ar}\}_{r=1}^{R_a}$$

Further, a collection of D of lyrics of all of the artists is represented by $D=\{D_a\}_{a \in A}$.

The means 7 for generating topic numbers generates a topic number k of 1 to K (a positive integer) as illustrated in step ST2 of FIG. 2. In the first embodiment, the means 7 for generating topic numbers generates topic numbers of 1 to 20.

Figure 5:
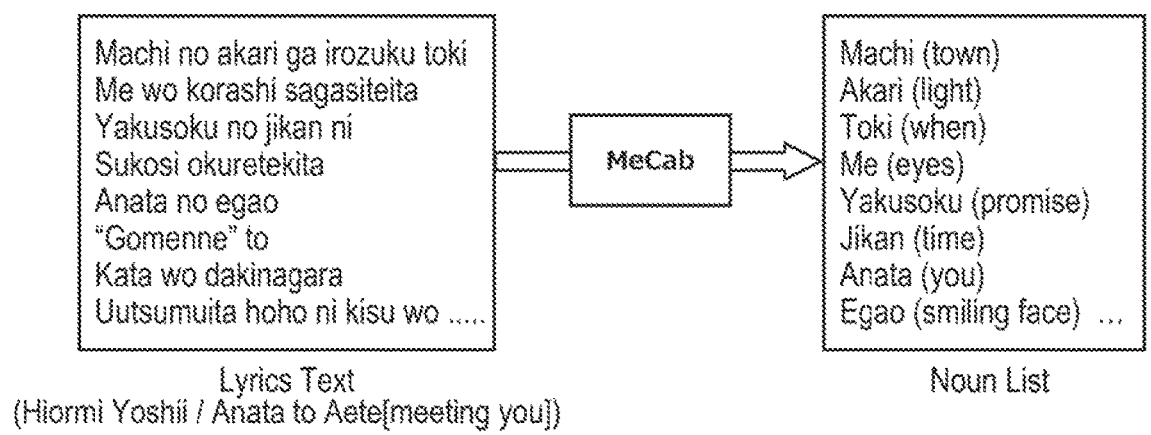
FIG. 5 illustrates an example of morpheme analysis.

As illustrated in step ST3 of FIG. 2 and FIG. 5, the analysis means 11 analyzes a plurality of lyrics in a plurality of lyrics data by means of morpheme analysis to extract a plurality of words. The morpheme analysis is performed using a morpheme analysis engine that extracts a group of nouns or particular parts of speech from sentences as words. There have currently been proposed various morpheme analysis engines. With a morpheme analysis engine, it is possible to readily extract words from even a considerable amount of songs. In the first embodiment, as illustrated in FIG. 5, an open source morpheme analysis engine called MeCab (HYPERLINK "http://taku910.github.io/mecab/) is used. Here, the number of nouns or particular parts of speech included in the lyric $S_{ar}$ is mathematically defined as $V_{ar}$.

Figure 6A:
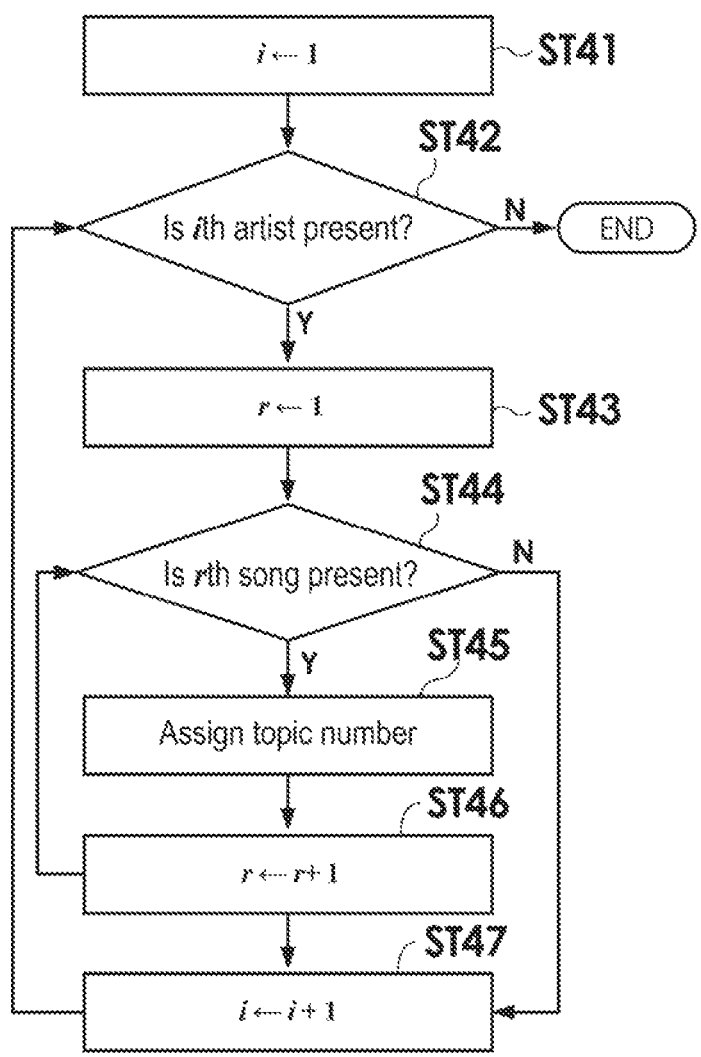
FIG. 6A is a flowchart of an algorithm for automated assignment of topic numbers.
Figure 6B:
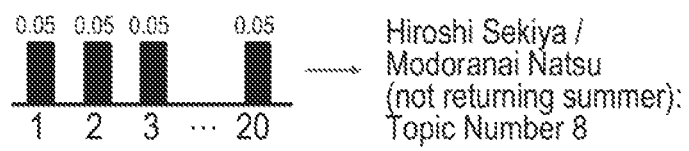
FIG. 6B illustrates an example of assignment of an initial topic number.

As illustrated in step ST4 of FIG. 2 and steps ST41 to ST47 of FIG. 6A, the means 9 for learning topic numbers assigns topic numbers respectively to a plurality of lyrics data of each of the artists i in a random or arbitrary manner. In the first embodiment, as illustrated in FIG. 6B, an occurrence probability of a plurality of lyrics data to which a topic number is assigned is initially set as 0.05=(1/K).

Figure 7:
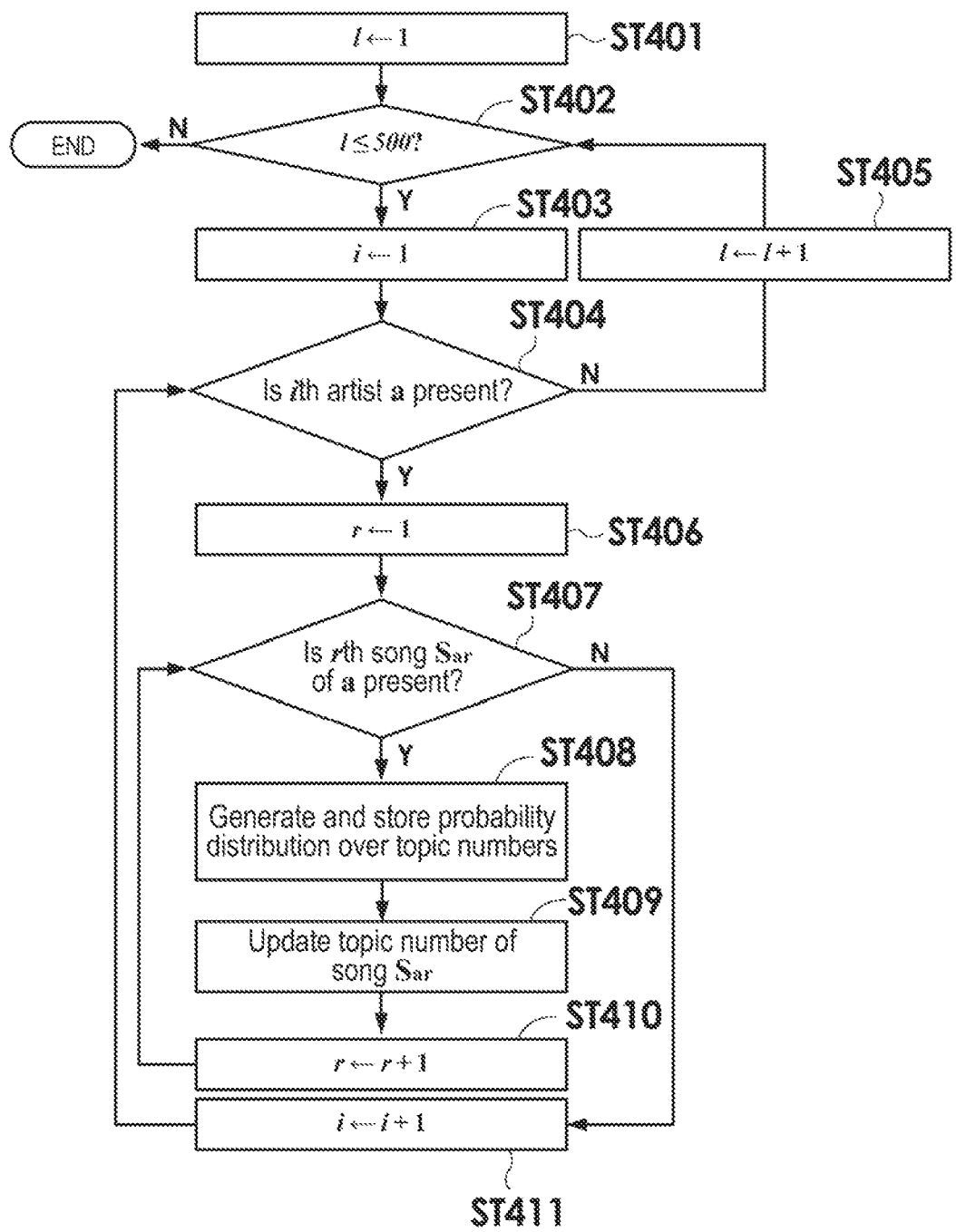
FIG. 7 illustrates an example algorithm when a means of learning topic numbers is implemented as software.

FIG. 7 illustrates an example algorithm of software when implementing the means 9 for learning topic numbers using a computer. In the algorithm of FIG. 7, an operation of updating and learning topic numbers (steps ST403 to ST411) is performed for a predetermined number of times (ST402). The operation of updating and learning topic numbers performs an operation of updating topic numbers (steps ST404 to ST411 of FIG. 7) on all of a plurality of lyrics data of each of the artists i. In the first embodiment, it is assumed that topic numbers assigned to all of a plurality of lyrics but the topic number k (an integer of k=1 to K) assigned to the given lyrics data $S_{ar}$ of the given artist a are correct. A probability that the topic number assigned to the given lyrics data $S_{ar}$ of the given artist a is k is calculated to generate a probability distribution over topic numbers (step ST408).

Figure 8:
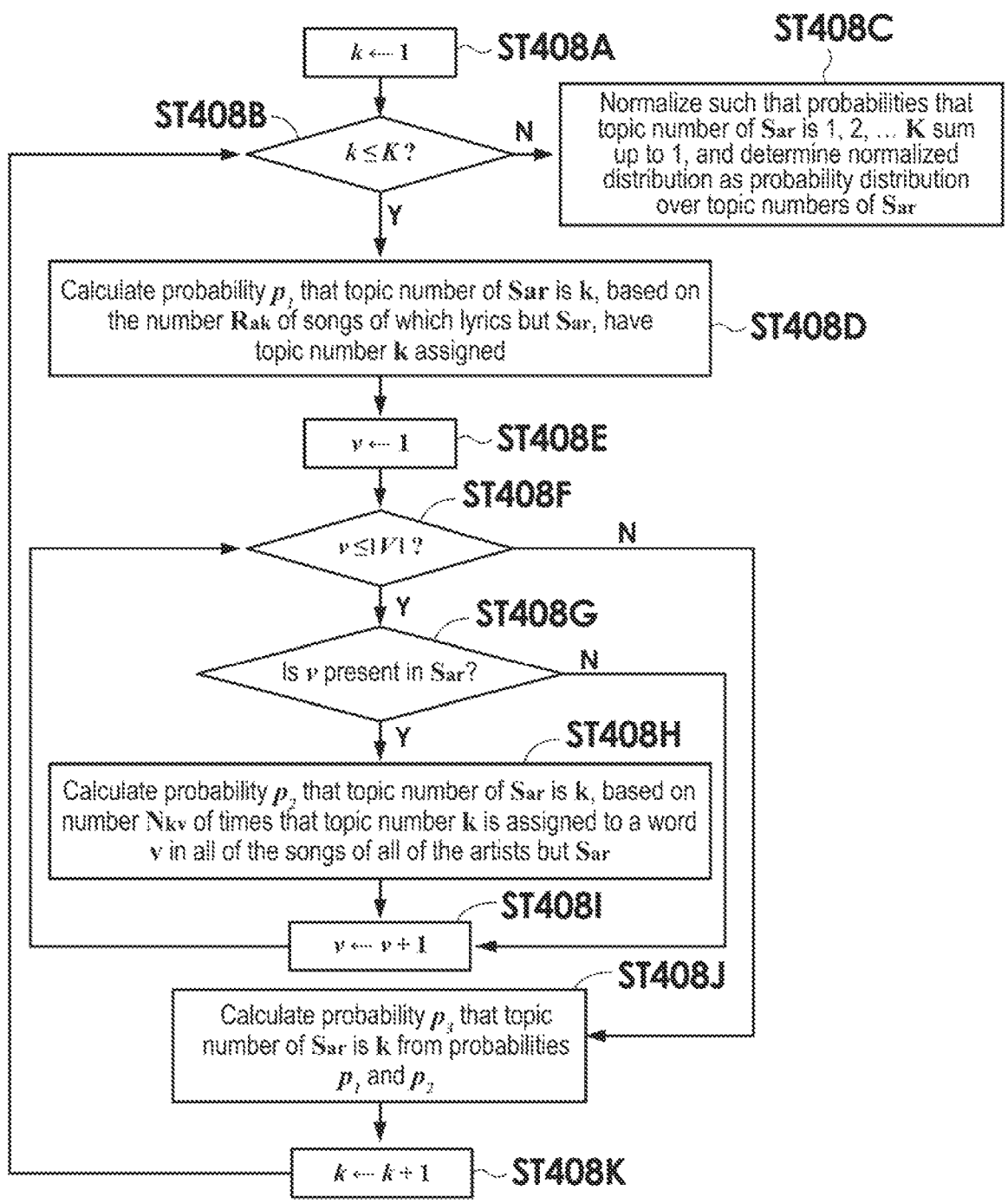
FIG. 8 is a detailed flowchart illustrating Step ST408 in the step illustrated in FIG. 7.

FIG. 8 is a detailed flowchart illustrating Step 408. When generating a probability distribution over the topic numbers, first, a first probability $p_1$ that the topic number of the given lyrics data $S_{ar}$ is k is calculated, based on the number $R_{ak}$ of all of the lyrics data but the given lyrics data $S_{ar}$ of the given artist a (step ST408D). Next, a second probability $p_2$ that the topic number of the given lyrics data $S_{ar}$ is k is calculated, based on the number $N_{kv}$ of times that the topic number k is assigned to the word v in a plurality of lyrics data of a plurality of artists but the given lyrics data $S_{ar}$ (steps ST408E to 51408H). In step ST408F, it is determined whether a given word v is present in a collection V of words. In step ST408G, it is determined whether that word is present in the given lyrics data $S_{ar}$. In step ST408G, if "N", the process goes to step ST408I where a next word is processed. In step ST408F, if "N", any word is not present anymore and the process goes to step ST408J. In step ST408J, a probability p that the topic number of the given lyrics data $S_{ar}$ is k is calculated, from the first probability $p_1$ and the second probability $p_2$. The above-mentioned calculations are performed on all of the topic numbers (1 to K), and probabilities that the topic number of the given lyrics data $S_{ar}$ is any one of 1 to K are normalized such that normalized probabilities sum up to 1 (one). Thus, a probability distribution over topic numbers of the given lyrics data $S_{ar}$ is determined (step ST408C). With these calculations, the accuracy is increased for the probability distribution over topic numbers.

Next, in step ST409, the topic number of the song, namely, the given lyrics data $S_{ar}$ is updated. In updating the topic number, the topic number assigned to the given lyrics data $S_{ar}$ of the given artist a is updated using a random number generator having a deviation of appearance probability corresponding to the probability distribution over topic numbers (step ST409). The operation of updating topic numbers (steps ST403, ST409) is performed on all of a plurality of lyrics data of each of a plurality of artists (steps ST 404, ST411). Then, the operation of updating and learning topic numbers (steps ST403 to ST411) is performed for a predetermined number of times [in an example of FIG. 7, 500 times]. Imaginarily, the probability of topic numbers is illustrated in FIG. 6B. The "random number generator" used herein is conceptually described as follows. In the first embodiment, assume an imaginary polyhedron dice having 20 faces corresponding to the topic numbers, and each face having an area proportional to its appearance probability.

When rolling the imaginary dice, the number (a number of 1 to 20) assigned to the appearing face of the dice is defined as an updated topic number.

As illustrated in step ST5 of FIG. 2, the outputting means 13 of FIG. 1 outputs the respective topic numbers of a plurality of lyrics data of each of a plurality of artists i, and the probability distributions over words for each of the topic numbers, based on learning results obtained by the means 9 for learning topic numbers. In the outputting means 13, the topic number of each of a plurality of lyrics data is a topic number that is last assigned to each of a plurality of lyrics data after the operation of updating and learning topic numbers is performed for a predetermined number of times (in the first embodiment, 500 times) in the means 9 for learning topic numbers. Thus, outputting the results of last assignment enables assignment of topic numbers suitable for a plurality of lyrics data.

Specifically, a last updated value is determined as the topic number assigned to lyrics data in step ST409 of FIG. 7 "Update Topic Number". The outputting means 13 outputs a word probability distribution for each of the topic numbers, based on the number $N_{kv}$ of times that the topic number k is assigned to a word v. Specifically, the occurrence probability $\theta_{kv}$ of the word v to which the topic number k is assigned is calculated by the following equation. From the calculated occurrence probability, a word probability distribution for each topic number is identified.

$$\theta_{kv} = (N_{kv} + \beta)/(N_k + \beta|V|)$$

Where $N_{kv}$ denotes the number of times that the topic number k is assigned to the given word v, $N_k$ denotes the number of all the words to which the topic number k is assigned, $\beta$ denotes a smoothing parameter for the number times of word appearing, and $|V|$ denotes the number of kinds of words.

(Equation-Based Updating of Topic Numbers)

Updating of topic numbers as mentioned above will be theoretically described below. First, it is assumed that each of $\theta a$, $\varphi k$, $\varphi$, and $\lambda a$ has a Dirichlet distribution of parameters $\alpha$, $\beta$, $\gamma$, and $\rho$ as a prior distribution. Defining that the topic number of the song $S_{ar}$ of the artist a as $Z_{ar}$, the value of the switch variable of the jth word in the lyrics $S_{ar}$ of the artist a as $X_{arj}$, a collection D of lyrics and a collection Z of topic numbers are represented by the following equation.

$$Z = \{\{z_{ar}\}_{r=1}^{R_a}\}a \in A$$

A collection X of switch variables is represented by the following equation.

$$X = \{\{\{x_{arj}\}_{j=1}^{V_{ar}}\}_{r=1}^{R_a}\}a \in A$$

The joint distributions is represented by the following equation.

$$P(D,Z,X|\alpha,\beta,\gamma,\rho) = \iiiint P(D,Z,X|\Theta,\Phi,\Psi,\Lambda)P(\Theta|\alpha)P(\Phi|\beta)P(\psi|\gamma) \times P(\Lambda|\rho)d\Theta d\Phi d\psi d\Lambda \quad (1)$$

Here, the following equation holds.

$$\Theta = \{\theta_a\}a \in A \quad \Phi = \{\phi_k\}_{k=1}^K \quad \Lambda = \{\lambda_a\}a \in A$$

P(D, Z, X|$\alpha$,$\beta$, $\gamma$, $\rho$) represents a probability that the following combination occurs: words (D) of all of the lyrics, all of the topic numbers (Z), and assignment of all of the switch variables (X) when topic number assignment for all of the songs of all of the artists and values of switch variables assignment for all of the words of all of the songs of all of the artists are determined. Equation (1) is calculated by integrating out these parameters as follows.

$$P(D, Z, X \mid \alpha, \beta, \gamma, \rho) = \left(\frac{\Gamma(\alpha K)}{\Gamma(\alpha)^K}\right)^{|A|} \quad (2)$$

$$\prod_{a \in A} \frac{\prod_{k=1}^{K} \Gamma(R_{ak} + \alpha)}{\Gamma(R_a + \alpha K)} \times \left(\frac{\Gamma(\beta|V|)}{\Gamma(\beta)^{|V|}}\right)^K \prod_{k=1}^{K} \frac{\prod_{v \in V} \Gamma(N_{kv} + \beta)}{\Gamma(N_k + \beta|V|)} \times \frac{\Gamma(\gamma|V|)}{\Gamma(\gamma)^{|V|}}$$

$$\frac{\prod_{v \in V} \Gamma(N_{1v} + \gamma)}{\Gamma(N_1 + \gamma|V|)} \times \left(\frac{\Gamma(2\rho)}{\Gamma(\rho)^2}\right)^{|A|} \prod_{a \in A} \frac{\Gamma(\rho + N_{a0})\Gamma(\rho + N_{a1})}{\Gamma(2\rho + N_a)}.$$

Here, $N_{a0}$ and $N_{a1}$ respectively denote the number of words for which the value of switch variable is 0 (zero) and the number of words for which the value of switch variable is 1 (one) in the lyrics of the artist a, and $N_a = N_{a0} + N_{a1}$. $N_1$ denotes the number of words v for which the value of switch variable is one, $N_1 = \Sigma_v \in_v N_{1v}$. Here, $N_k = \Sigma_v \in_v N_{kv}$, and $N_{kv}$ denotes the number of times that the topic number k is assigned to the word v under the condition of a switch variable of 0 (zero). $R_{ak}$ denotes the number of lyrics to which the topic number k is assigned in the lyrics of the artist a.

$$R_a = \Sigma_{k=1}^K R_{ak}$$

The term of expression (3) in equation (2) denotes a probability that when assignment of topic numbers to all of the lyrics is determined, that assignment is observed.

$$\left(\frac{\Gamma(\alpha K)}{\Gamma(\alpha)^K}\right)^{|A|} \prod_{a \in A} \frac{\prod_{k=1}^{K} \Gamma(R_{ak} + \alpha)}{\Gamma(R_a + \alpha K)}. \quad (3)$$

The term of the following expression (4) in equation (2) denotes a probability that when assignment of values of switch variables to all of the words in all of the lyrics is determined, that assignment is observed.

$$\left(\frac{\Gamma(2\rho)}{\Gamma(\rho)^2}\right)^{|A|} \prod_{a \in A} \frac{\Gamma(\rho + N_{a0})\Gamma(\rho + N_{a1})}{\Gamma(2\rho + N_a)}. \quad (4)$$

The term of the following expression (5) in equation (2) denotes a probability that when assignment of all of the topic numbers to all of the lyrics and assignment of all of the values of switch variables to all of the words in all of lyrics are determined, all of the words in all of the lyrics are observed.

$$\left(\frac{\Gamma(\beta|V|)}{\Gamma(\beta)^{|V|}}\right)^K \prod_{k=1}^{K} \frac{\prod_{v \in V} \Gamma(N_{kv} + \beta)}{\Gamma(N_k + \beta|V|)} \times \frac{\Gamma(\gamma|V|)}{\Gamma(\gamma)^{|V|}} \frac{\prod_{v \in V} \Gamma(N_{1v} + \gamma)}{\Gamma(N_1 + \gamma|V|)}. \quad (5)$$

A probability of $Z_{ar}=k$ is represented by equation (6) when the topic number of a song $S_{ar}$ of the artist a is defined as $Z_{ar}$.

$$p(z_{ar} = k \mid D, X, Z_{ar}) \propto \frac{R_{ak\backslash ar} + \alpha}{R_a - 1 + \alpha K} \frac{\Gamma(N_{k\backslash ar} + \beta|V|)}{\Gamma(N_{k\backslash ar} + N_{ar} + \beta|V|)} \times \prod_{v \in V} \frac{\Gamma(N_{kv\backslash ar} + N_{arv} + \beta)}{\Gamma(N_{kv\backslash ar} + \beta)}. \quad (6)$$

In the above equation, $\backslash_{ar}$ denotes a value when rth lyrics of the artist a is excluded. $N_{ar}$ denotes the number of words in rth lyrics of the artist a, and $N_{arv}$ denotes the number of words v appearing in rth lyrics of the artist a. In equation (6), the term of expression (7) in equation (6) denotes how many topic numbers k are assigned to the lyrics other than rth lyric of the artist a. In other words, the more the topic number k is assigned to the songs of the artist a, the higher the probability that the topic number assigned to rth lyric of the artist a is k will be.

$$\frac{R_{ak\backslash ar} + \alpha}{R_a - 1 + \alpha K}. \quad (7)$$

The term of expression (8) in equation (6) denotes how many words the topic number k is assigned to in the rth lyrics of the artist a when looking into the songs other than the rth song of the artist a. For example, if a word "Natsu (summer)" is presented in the rth song of the artist a, it is taken into consideration how many times the topic number k is assigned to the word "Natsu (summer)" in all of the songs but the rth song of the artist a. Here, when the topic number of the song is k, it is considered that the topic number k is assigned to all of the words in the lyrics of that song. Namely, the more words the topic number k is assigned in the lyrics of the rth song of the artist a, the higher the probability that the topic number of the rth song of the artist a is k will be.

$$\frac{\Gamma(N_{k\backslash ar} + \beta|V|)}{\Gamma(N_{k\backslash ar} + N_{ar} + \beta|V|)} \prod_{v \in V} \frac{\Gamma(N_{kv\backslash ar} + N_{arv} + \beta)}{\Gamma(N_{kv\backslash ar} + \beta)}. \quad (8)$$

Updating of the topic number is performed so as to increase the value of equation (2). In parallel with updating of the topic numbers for each of the lyrics, a probability distribution over words for each topic number is also updated.

The switch variable as described above is theoretically a switch variable output by a means 115 for learning values of switch variables in a second embodiment as described later. In the first embodiment, the switch variable is assumed to be 0 (zero), and the value of a switch variable is not updated. Accordingly, background words are not taken into consideration.

Second Embodiment

Figure 9:
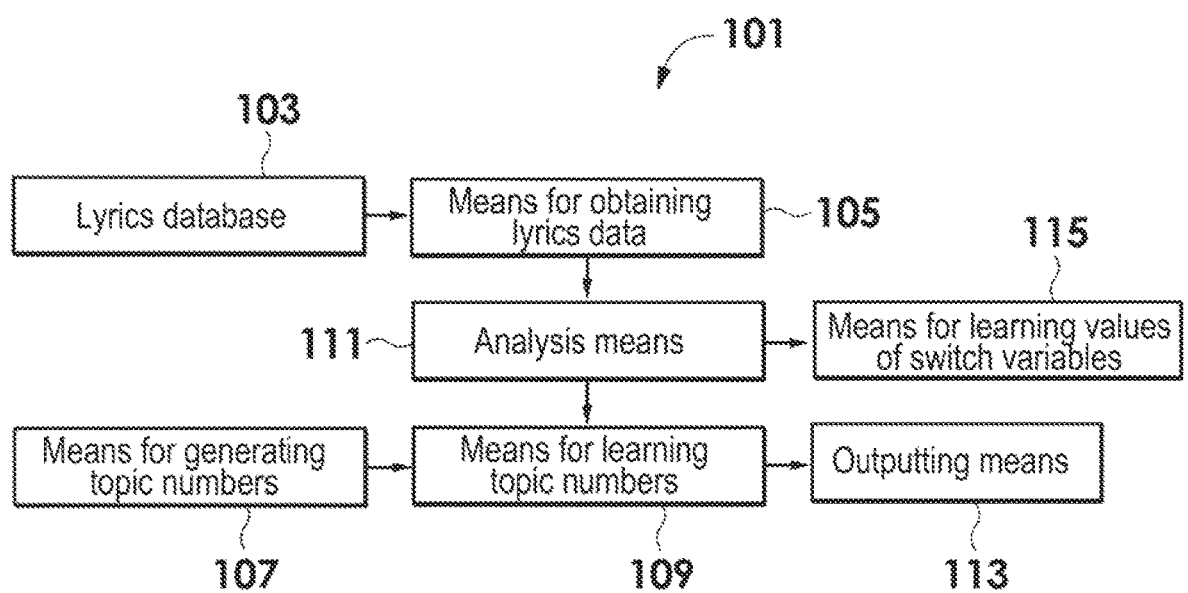
FIG. 9 is a block diagram illustrating a second embodiment of a system for generating topic inference information of lyrics according to the present invention.
Figure 10:
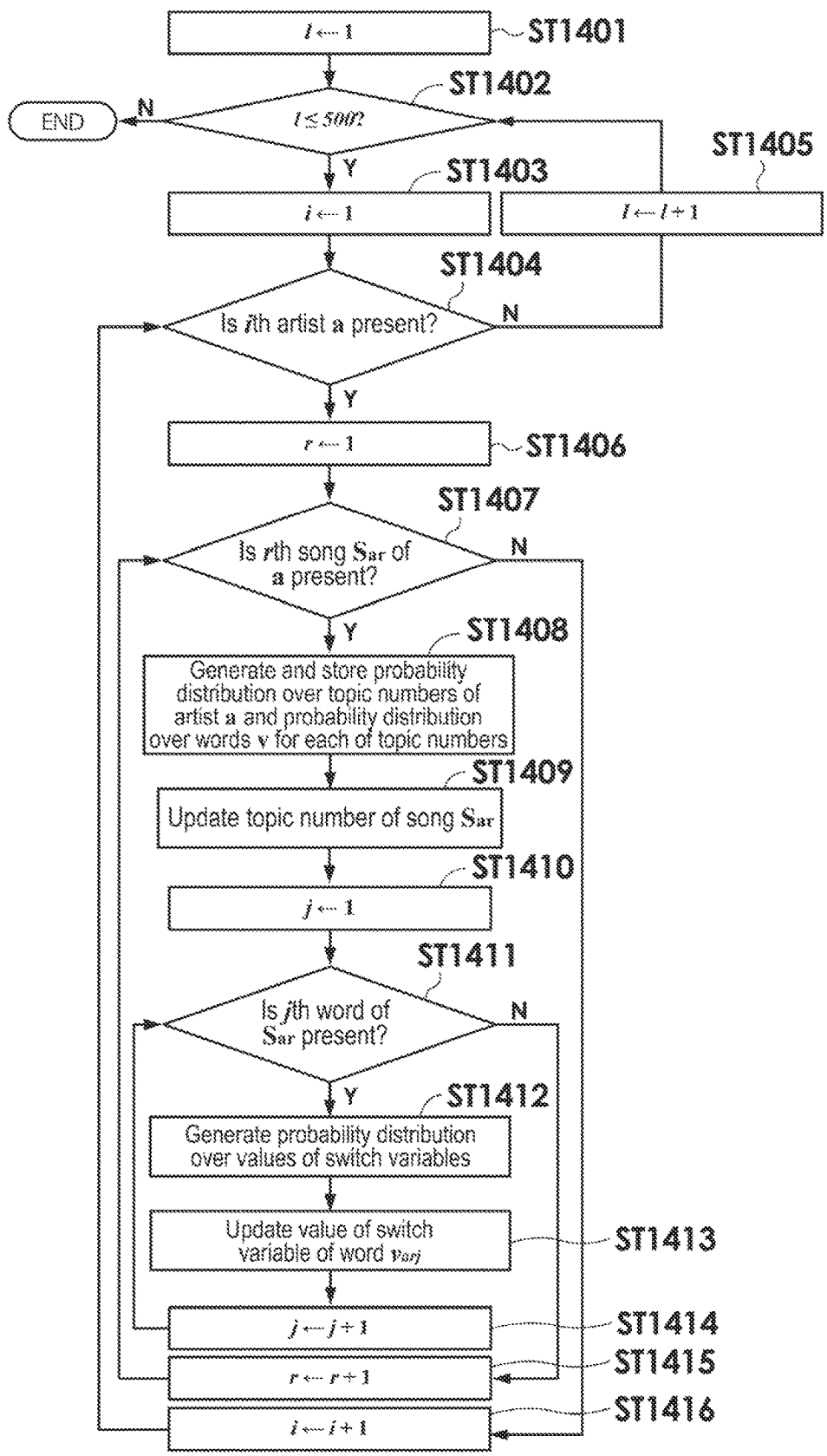
FIG. 10 is a flowchart illustrating an example algorithm of a computer program when implementing the system of the second embodiment of the present invention on a computer.

FIG. 9 is a block diagram illustrating a second embodiment of a system for generating topic inference information according to the present invention. Each block of the illustrated embodiment is implemented on a computer by a computer program installed in the computer, or are implemented by a plurality of processors and a plurality of memories. FIG. 10 is a flowchart illustrating an example algorithm of a computer program when implementing the system of the second embodiment of the present invention on a computer.

The second embodiment is different from the first embodiment as illustrated in FIGS. 1 to 8 in that the means 115 for learning values of switch variables is provided in the second embodiment. The two embodiments are common in other aspects. In FIG. 9, reference signs for the elements in the second embodiment are obtained by adding 100 to reference signs of the counterpart elements having the same or similar functions in the first embodiment illustrated in FIG. 1, and descriptions thereof are omitted here. In the flowchart of FIG. 10, likewise, reference signs for the steps in the second embodiment are obtained by adding 1000 to reference signs of the counterpart steps having the same or similar functions in the first embodiment illustrated in FIG. 7, and descriptions thereof are omitted here. In the model of lyrics generative process of FIG. 11, further, reference signs for the steps in the second embodiment are obtained by adding 10 to reference signs of the counterpart steps having the same or similar functions in the first embodiment illustrated in FIG. 3, and descriptions thereof are omitted here.

In the second embodiment, as illustrated in FIG. 9, the means 115 for learning values of switch variables is provided. Here, when determining the jth word included in the lyrics, the "value of a switch variable" determines whether the word concerned is a word related to the topic or a background word unrelated to the topic. Namely, the switch variable is a variable for specifying whether a given word is related to the subject of an assumed topic or the background. Identification of the switch variable by means of computation eliminates the need of manually specifying a collection of words related to the topics or a collection of unrelated words. The value of 0 (zero) for the switch variable indicating that the word concerned is fully or 100% related to the topic has an occurrence probability of 1 (one). The value of 0 (zero) for the switch variable indicating that the word concerned is 50% related to the topic has an occurrence probability of 0.5. When determining the jth word, the probability distribution over values of the switch variables of the jth word is used. When manually generating lyrics, the probability distribution over values of switch variables will be manually specified.

Figure 11:
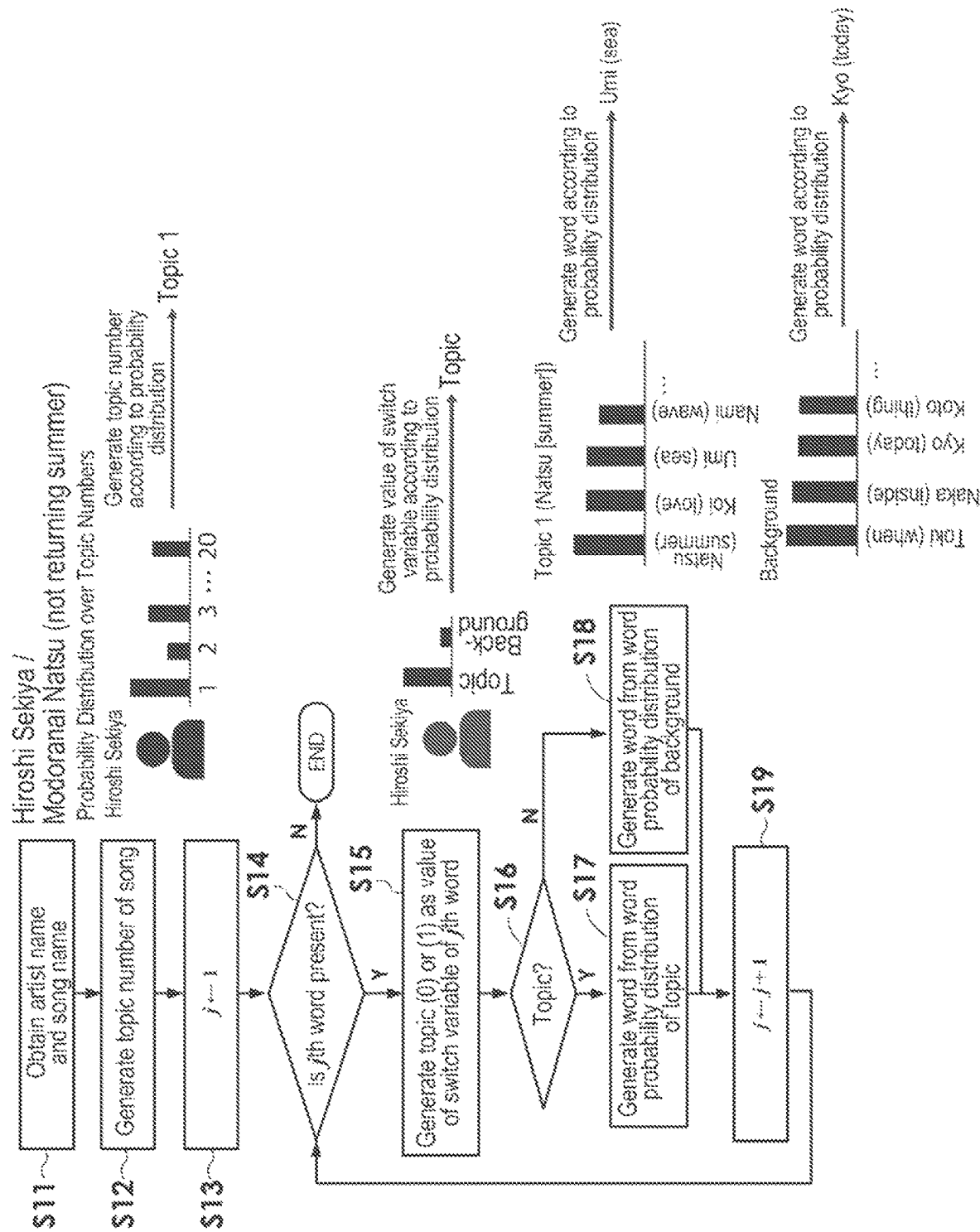
FIG. 11 is used for explaining a model for the lyrics generative process.

In steps S14 to S18 of FIG. 11, based on the probability of the value of the switch variable of the jth word, depending upon whether the probability distribution indicates the topic or not (step S16), the jth word is generated from the word probability distribution for the topic (step S17) or a background word is generated from the word probability distribution (step S18). Once the jth word is determined, the j+1th word is determined (step S19), and thereafter lyrics generation is completed when all of the words are determined.

Figure 12A:
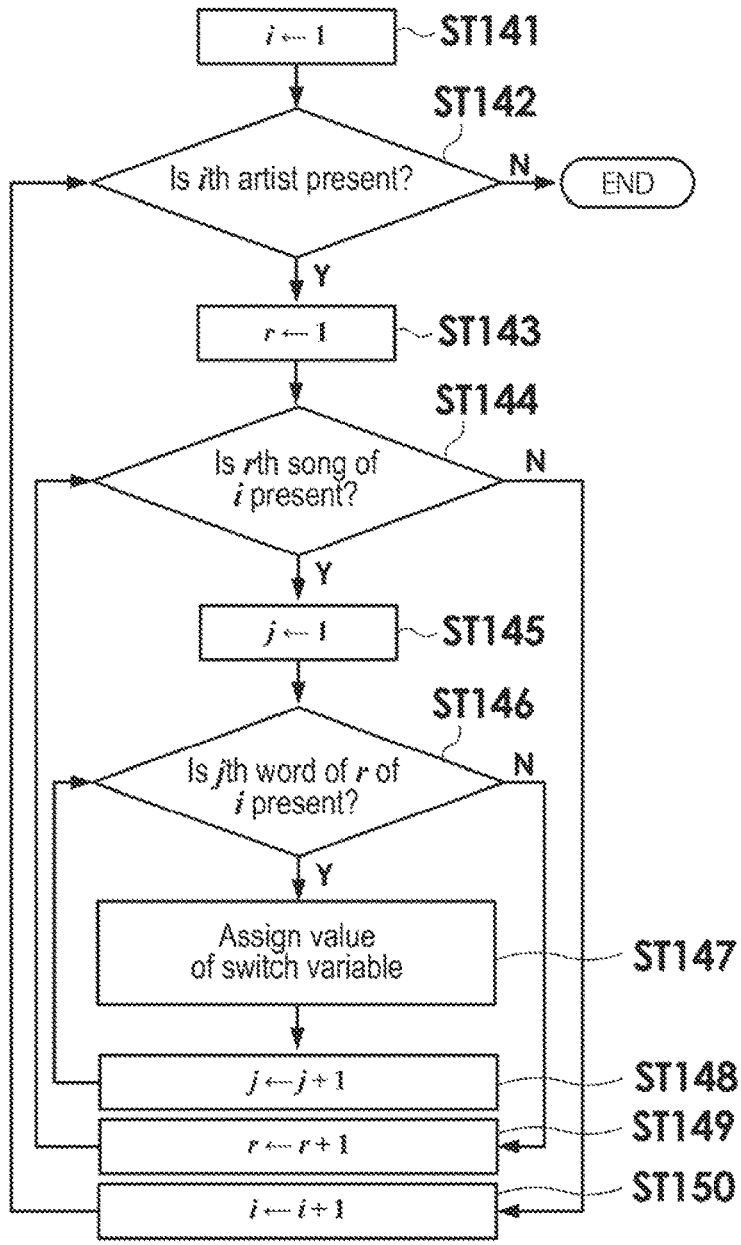
FIG. 12A is a flowchart illustrating an algorithm for assigning a value of a switch variable to each word included a plurality of lyrics data of each of a plurality of artists in a random or arbitrary manner.
Figure 12B:
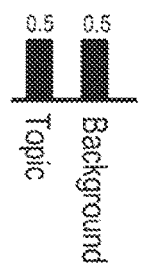
FIG. 12B illustrates an example initial switch variable.

The means 115 for learning values of switch variables performs an operation of updating and learning of values of switch variables [steps ST1409 to ST1415 of FIG. 10] for a predetermined number of times [in the illustrated example, 500 times]. In the operation of updating and learning of values of switch variables, values are assigned, as prior preparations, to a plurality of words included in a plurality of lyrics data of each of a plurality of artists in a random or arbitrary manner as illustrated in the flowchart of FIG. 12A (steps ST141 to ST150). As illustrated in FIG. 12B, in the illustrated example, it is initially assumed that a probability that a word is related to the topic or a probability that a word is related to the background are respectively 0.5.

As illustrated in FIG. 10, the means 115 for learning values of switch variables assumes that values of switch variables assigned to all of words but the value of the switch variable x (x=a probability variable indicative of a topic word or a background word) assigned to a given word v in a plurality of words of a given lyrics data of a given artist are correct. The means 115 calculates a probability whether a value of the switch variable x assigned to a given word v is 0 (zero) or 1 (one), and generates a probability distribution over values of switch variables $\lambda_a$ (steps ST1410 to ST1412 in FIG. 10).

Figure 13:
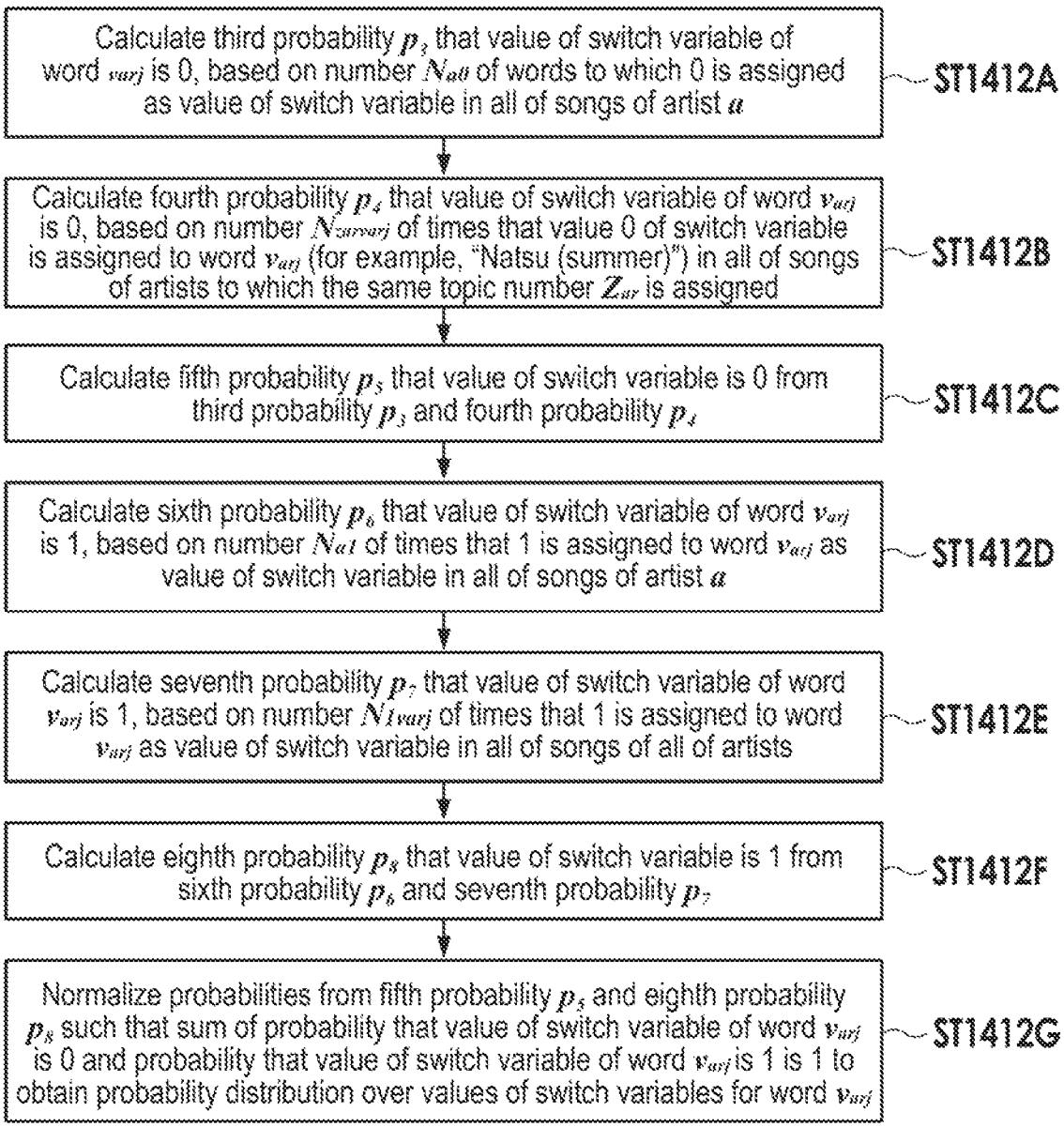
FIG. 13 is a detailed flowchart illustrating Step ST1412 "Generate Probability Distribution over Values of Switch Variables" in FIG. 10.

FIG. 13 is a detailed flowchart illustrating Step ST1412 "Generate Probability Distribution over Values of Switch Variables" in FIG. 10. First, a third probability $p_3$ that the value of the switch variable for the word $v_{arj}$ is 0 (zero) is calculated, based on the number $N_{a0}$ of words $V_{arj}$ to which a value of 0 (zero) is assigned as the value of the switch variable in all of lyric data of all of songs for a given artist a (step ST1412A). Next, a fourth probability $p_4$ that the value of the switch variable of the word $v_{arj}$ is 0 (zero) is calculated, based on the number $Nz_{ar}v_{arj}$ of times that 0 (zero) is assigned to the value of the switch variable of the word $v_{arj}$ in all of songs of all of artists to which the same topic number $Z_{ar}$ as the lyrics including the word $v_{arj}$ is assigned (step ST1412B). Then, a fifth probability $p_5$ that the value of the switch variable is 0 (zero) is calculated from the third probability $p_3$ and the fourth probability $p_4$ (step ST1412C). Further, a sixth probability $p_6$ that the value of the switch variable of the word $V_{arj}$ is 1 (one) is calculated, based on the number $N_{a1}$ of times that 1 (one) is assigned as the value of the switch variable in the plurality lyrics data of the given artist (step ST1412D). A seventh probability $p_7$ that the value of the switch variable of the word $v_{arj}$ is 1 (one) is calculated, based on the number $N_{1varj}$ of times that 1 (one) is assigned as the value of the switch variable of the word $v_{an}$ in the plurality of lyrics data of the plurality of artists (step ST1412E). Then, an eighth probability $p_8$ that the switch variable value is 1 (one) is calculated from the sixth probability $p_6$ and the seventh probability $p_7$ (step ST1412F). The probabilities are normalized from the fifth probability $p_5$ and the eighth probability $p_8$ such that the probability that the value of the switch variable of the word $v_{arj}$ is 0 (zero) and the probability that the value of the switch variable of the word $v_{ar}$ is 1 (one) sum up to 1 (one), and then a normalization result is defined as the probability distribution over values of switch variables (step ST1412G).

(Equation-Based Updating of Switch Variables)

Updating of switch variables as mentioned above will be theoretically described below. First, it is assumed a value of the switch variable for the jth word in the lyrics data $S_{ar}$ of the artist a is $x_{arj}$. A probability that $x_{arj}=0$ is represented by the following equation.

$$P(x_{arj} = 0 \mid D, X_{\backslash arj}, Z, \alpha, \beta, \gamma, \rho) \propto \frac{\rho + N_{a0\backslash arj}}{2\rho + N_a - 1} \frac{N_{z_{ar}v_{arj}\backslash arj} + \beta}{N_{z_{ar}\backslash arj} + \beta|V|}. \tag{9}$$

In the above equation, $\backslash_{ar}$ denotes a value when the jth word of the rth lyrics of the artist a is excluded. The term of expression (10) in equation of (9) denotes how readily the artist a generates words from the topics. The larger the value is, the higher the probability that the value of the switch variable of the jth word in the rth lyrics of the artist a is 0 (zero) will be.

$$\frac{\rho + N_{a0\backslash arj}}{2\rho + N_a - 1}. \tag{10}$$

The term of expression (11) in equation of (9) denotes how readily the jth word in the rth lyrics of the artist a occurs at the topic number $Z_{ar}$. The larger the value is, the higher the probability that the value of the switch variable of the jth word in the rth lyrics of the artist a is 0 (zero) will be. For example, when the jth word of the rth lyrics of the artist a is "Natsu (summer)", it is taken into consideration how often 0 (zero) is assigned to the word "Natsu (summer)" as the value of the switch variable in all of the words of all of the songs of all of the artists to which the topic number $z_{ar}$ has been assigned.

$$\frac{N_{z_{ar}v_{arj}\backslash arj} + \beta}{N_{z_{ar}\backslash arj} + \beta|V|}. \tag{11}$$

Likewise the probability that $x_{arj}=1$ is represented as follows.

$$P(x_{arj} = 1 \mid D, X_{\backslash arj}, Z, \alpha, \beta, \gamma, \rho) \propto \frac{\rho + N_{a1\backslash arj}}{2\rho + N_a - 1} \frac{N_{1v_{arj}\backslash arj} + \gamma}{N_{1\backslash ark} + \gamma|V|}. \tag{12}$$

The term of expression (13) in equation (12) denotes how readily the artist a generates a word from the background words. The larger the value is, the higher the probability that the value of the switch variable of the jth word in the rth lyrics of the artist a is 1 (one) will be.

$$\frac{\rho + N_{a1\backslash arj}}{2\rho + N_a - 1}. \tag{13}$$

The term of expression (14) in equation (12) denotes how readily the jth word in the rth lyrics of the artist a generates a word from the background words. The larger the value is, the higher the probability that the value of the switch variable of the jth word in the rth lyrics of the artist a is 1 (one) will be.

$$\frac{N_{1v_{arj}\backslash arj} + \gamma}{N_{1\backslash arj} + \gamma|V|}. \tag{14}$$

Updating of the values of switch variables of the words as illustrated in step ST1413 of FIG. 10 is preferably performed so as to increase the value of equation (2). In parallel with updating the value of the switch variable of each word, a probability distribution over values of switch variables for each of the artists is also updated.

Specifically, an operation of updating the value of switch variable assigned to a given word is performed on all of a plurality of words included in a plurality of lyrics of each of a plurality of artists, using a random Number generator having a deviation of appearance probability corresponding to the probability distribution over values of the switch variables (step ST1412 to ST1416). The "random number generator" used herein is conceptually described as follows. In the second embodiment, assume an imaginary dihedron dice having two faces corresponding to two switch variables, and each face having an area proportional to its appearing probability. When rolling the imaginary dice, the number assigned to the appearing face of the dice is defined as an updated value of the switch variable.

As illustrated in step ST5 of FIG. 2 and FIGS. 14A and 14B, the outputting means 113 identifies the respective topic numbers of a plurality of lyrics data of each of a plurality of artists, based on the learning results of the means 109 for learning topic numbers and the results of the means 115 for learning values of switch variables (FIG. 14B), and generates an occurrence probability of words for each of a plurality of topic numbers (FIG. 14A). With this, it is possible to grasp the topics of lyrics of a plurality of songs of each of the artists that reflect the artists' personalities. Thus, it is possible to provide artist-based information to a person who chooses a song.

The topic number of each of a plurality of lyrics output by the outputting means 113 is a topic number last assigned to the lyrics data of each of the artists [the topic number last updated in step ST1409 of FIG. 10] after performing the operation of updating and learning topic numbers for a predetermined number of times [in FIG. 10, 500 times; step ST1402 in FIG. 10] in the means 109 for learning topic numbers. According to the last assignment, the most suitable topic number can be assigned to each of a plurality of lyrics data.

Likewise, the word probability distribution for each topic number output by the outputting means 113 is the last stored word probability distribution for each topic number after performing the operation of updating and learning topic numbers for a predetermined number of times [In FIG. 10, 500 times; step ST1402 in FIG. 10] in the means 109 for learning topic numbers. In the outputting means 113, an occurrence probability $\theta_{kv}$ of words for each topic number is preferably calculated as follows.

$$\theta_{kv} = \frac{N_{kv} + \beta}{N_k + \beta |V|}. \quad (15)$$

Where $N_{kv}$ denotes the number of times that the topic number k is assigned to the given word v, $N_k$ denotes the number of all of the words to which the topic number k is assigned, $\beta$ denotes a smoothing parameter, and $|V|$ denotes the number of kinds of words. Here, the smoothing parameter refers to the number of times of pseudo-occurrence of each word at each topic number. The number of kinds of words refers to the number of unique words included in the lyrics in the lyrics database illustrated in FIG. 4. In the computation using the above equation, a higher probability than 0 (zero) is assigned to a word that has never been assigned to any topic, thereby getting close to the human intuition.

(Effect Obtainable from Second Embodiment)

According to the second embodiment, once an arbitrary number of topics is determined, the last updated topic number for each of a plurality of lyrics data can be identified with the topic number as updated by the means for learning topic numbers. Further, an occurrence probability of words for each topic number is generated, based on the values of switch variables as last updated by the means for learning values of switch variables. Once the topic number of each of a plurality of lyrics data and the occurrence probability of words for each topic number have been determined, the word having a high occurrence probability can be known for each of topic number, thereby eliminating the need of manually specifying a collection of words related to the topics and a collection of words unrelated to the topics. Further, once a plurality of words having a high occurrence probability have been grasped, reliable information for determining the topics can be obtained from these words, thereby grasping likely meanings of the topics of the lyrics of each song.

[System for Topic Inference Information of Lyrics that have not Been Used in Learning]

Figure 15:
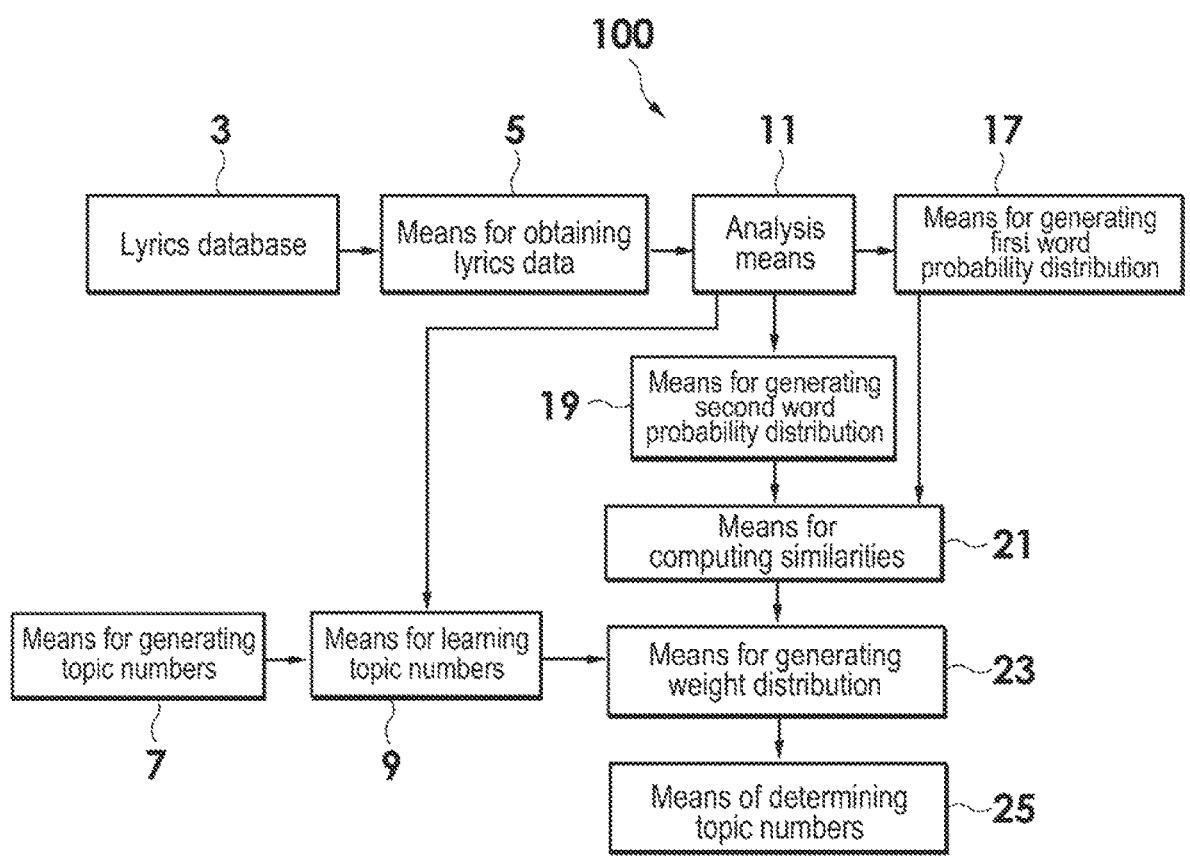
FIG. 15 is a block diagram illustrating a system configuration for obtaining topic numbers of lyric data of a new song of a given artist that has not been used in learning.
Figure 16A:
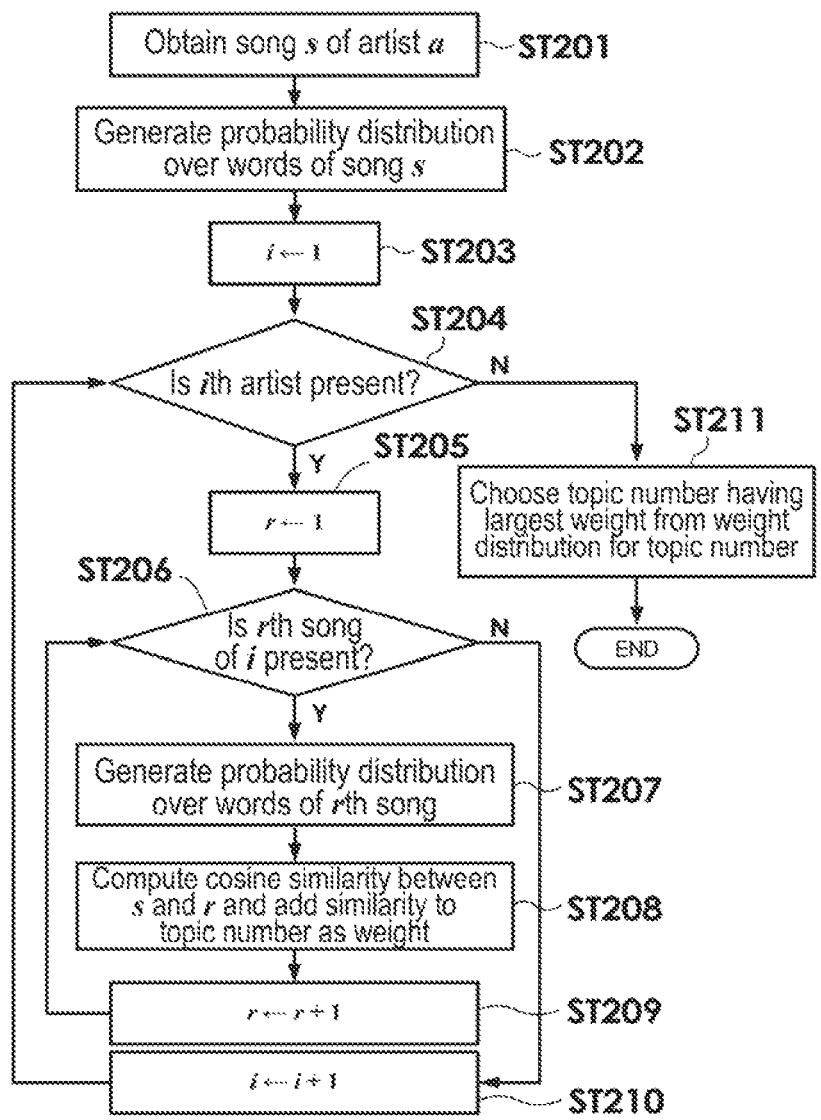
FIG. 16A is a flowchart illustrating an algorithm for implementing the system of FIG. 15 using software.
Figure 16B:
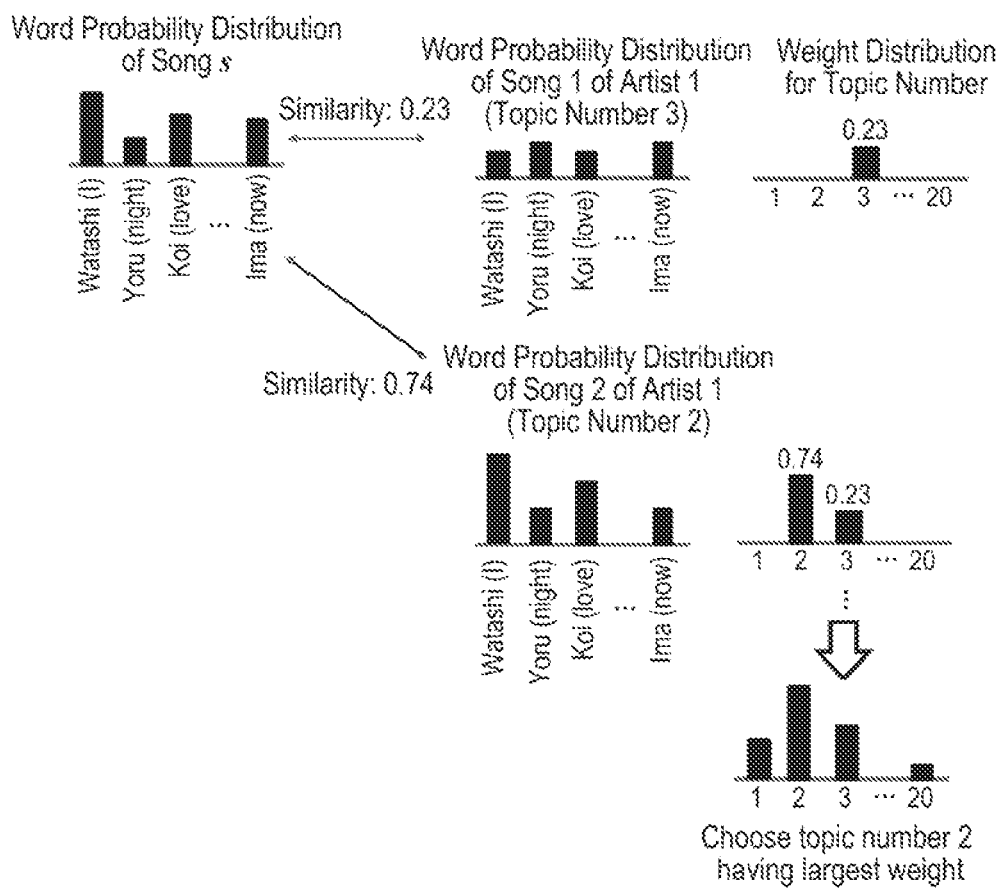
FIG. 16B schematically illustrates an idea of the algorithm of FIG. 16A.

When obtaining a topic number of a lyrics data of a new song of a given artist that has not been used in learning, the system may be configured as illustrated in FIG. 15. Steps ST201 to ST211 describe an algorithm for implementing the system of FIG. 15 using software. FIG. 16B schematically illustrates an idea of the algorithm of FIG. 16A. In the present embodiment, the system may further comprise a first means 17 for generating a word probability distribution for implementing step ST202 that generates a probability distribution over words included in lyrics data of a new song s of an artist that has not been used in learning; a second means 19 for implementing step ST207 that generates a word probability distributions over words included respectively in lyrics data of the plurality of songs of the plurality of artists; a means 21 for implementing step ST208 that computes cosine similarities and similarities according to an arbitrary scale respectively between the probability distribution over words included in the lyrics data of the new song s as calculated by the first means 17 for generating a word probability and the probability distributions over words included in the lyrics data of the plurality of songs as calculated by the second means 19 for generating word probability distributions; a means 23 for implementing step ST 211 that generates a weight distribution by adding the similarities of the lyrics data of the plurality of songs corresponding to the lyrics data of the plurality of songs to the topic numbers as a weight; and a means 25 for determining a topic number that determines a topic number having the largest weight as a topic number for the lyrics data of the new song s (remaining steps of step ST211). Thus, the topic can readily be determined for lyrics that have not been used in learning.

(System for Generating Occurrence Probability for Background Word)

Figure 17:
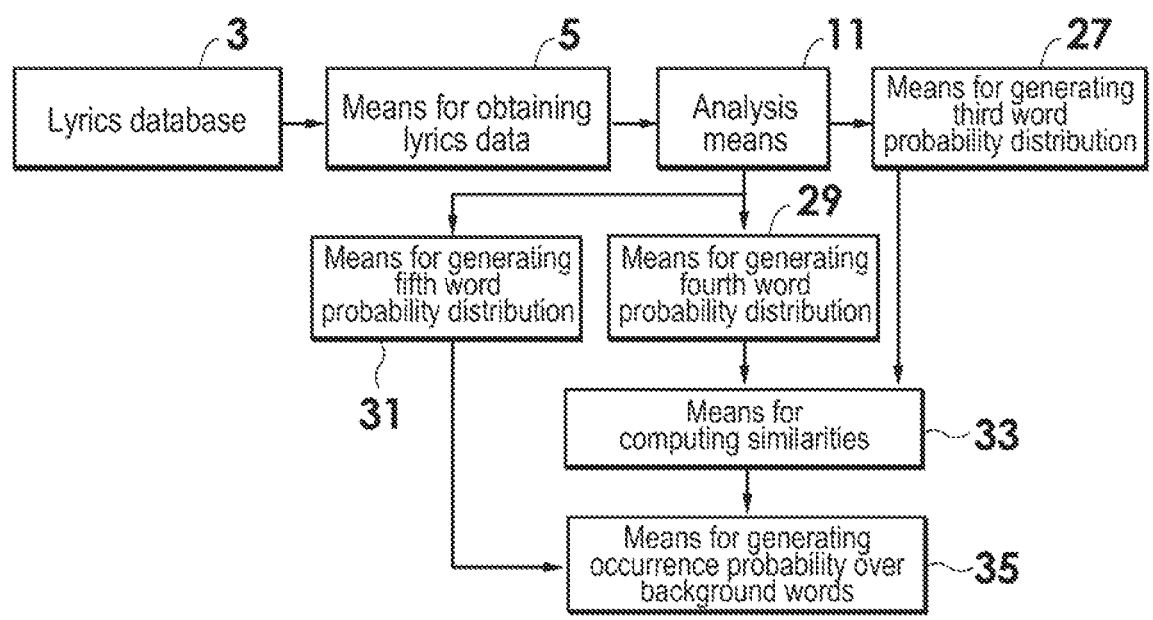
FIG. 17 is a block diagram illustrating a system configuration for generating an occurrence probability of background words as further information for determining a topic of lyrics data of a song of an artist.
Figure 18A:
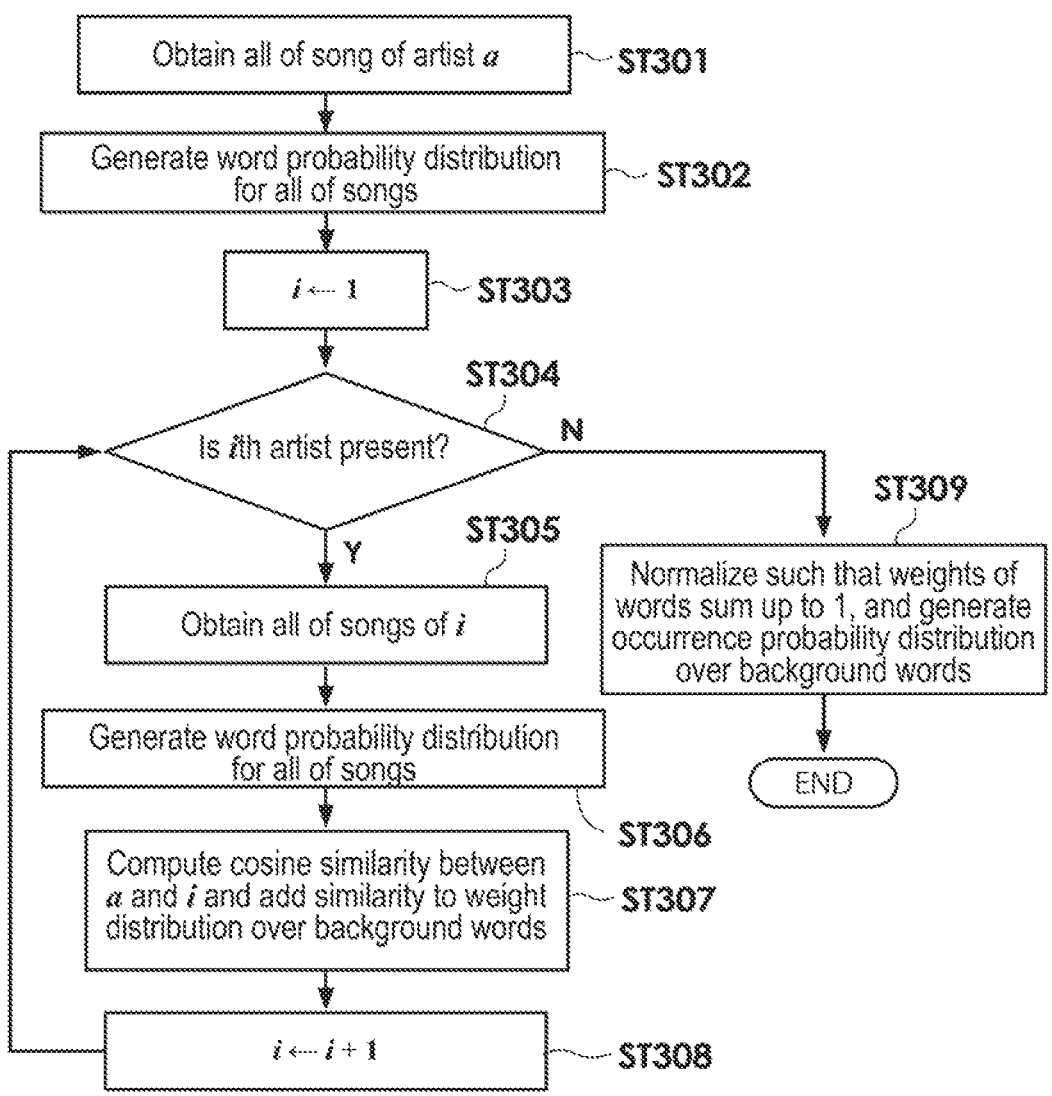
FIG. 18A is a flowchart illustrating an algorithm for implementing the system of FIG. 17 using software.
Figure 18B:
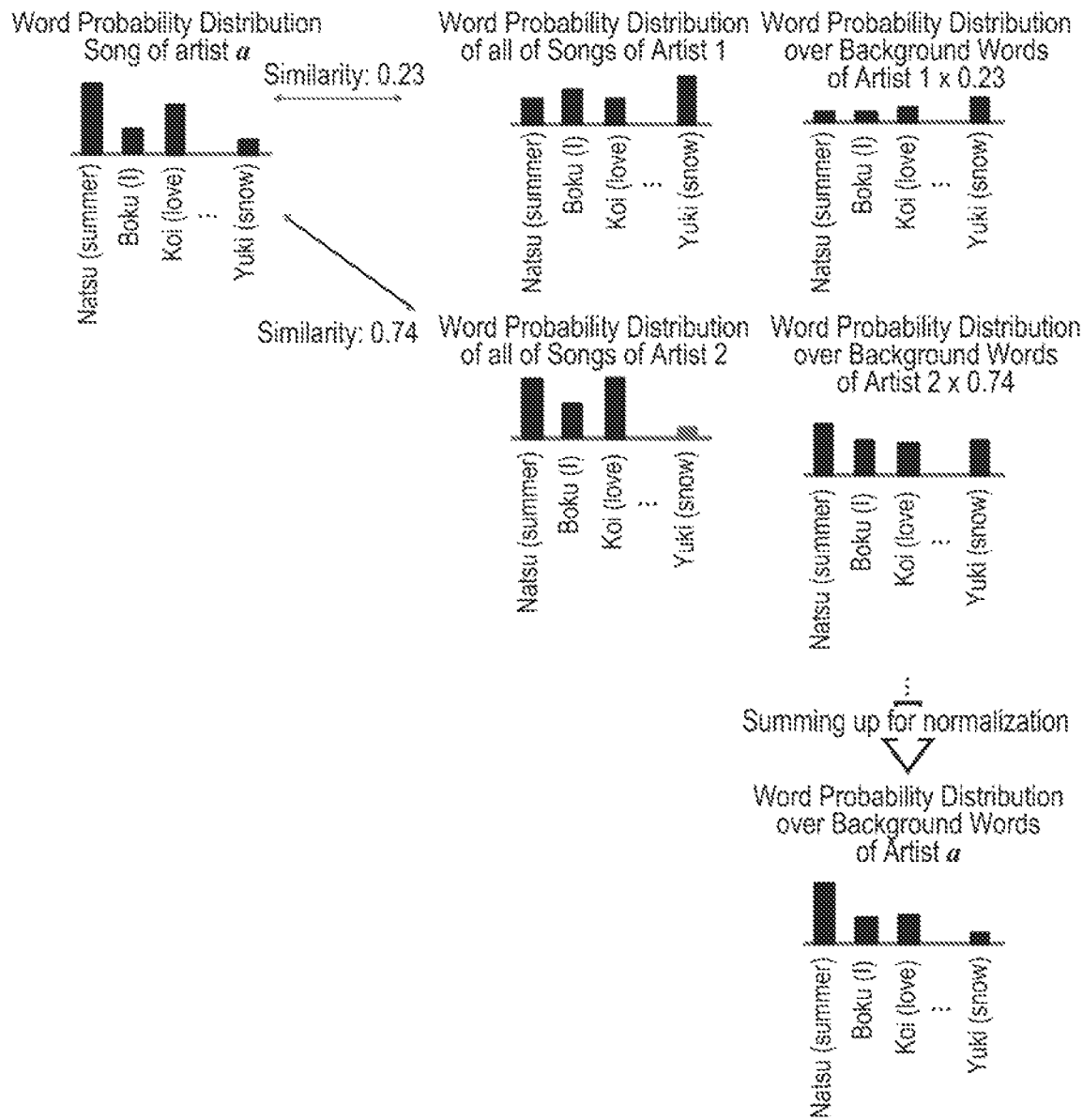
FIG. 18B schematically illustrates an idea of the algorithm of FIG. 18A.
Figure 21A:
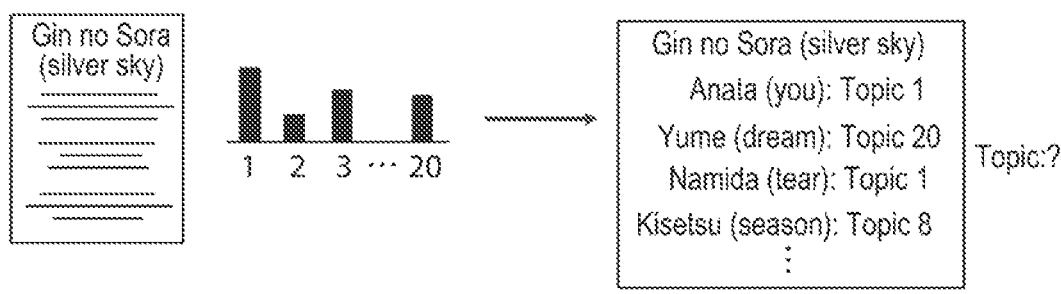
FIGS. 21A to 21C are used to explain problems when using the LDA to infer topics of lyrics.
Figure 21B:
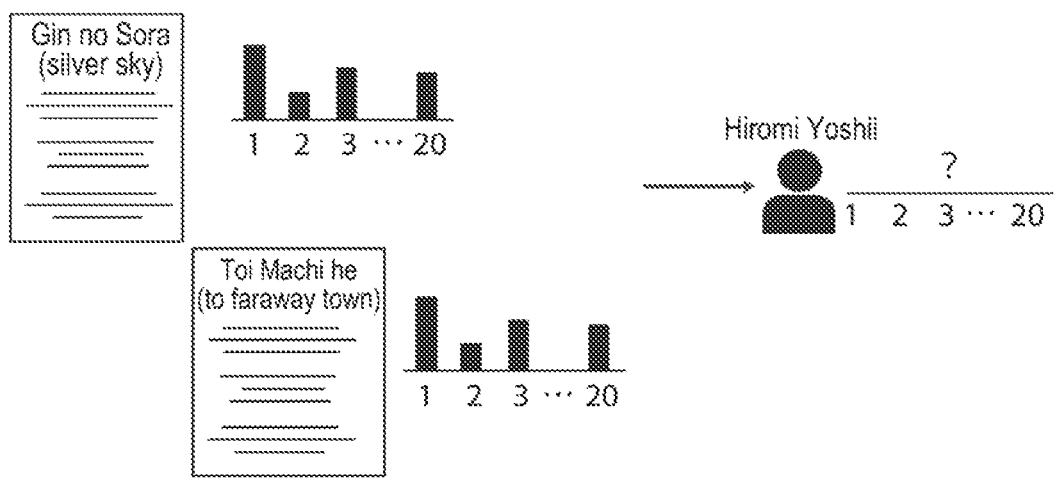
Figure 21C:
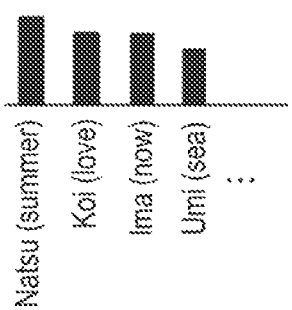

FIG. 17 is a block diagram illustrating a system configuration for generating an occurrence probability of background words as further information for determining a topic of lyrics data of a song of an artist that has not been used in learning. Steps ST301 to ST309 of FIG. 18A describe an algorithm for implementing the system of FIG. 17 using software. FIG. 18B schematically illustrates an idea of the algorithm of FIG. 18A. In FIG. 17, reference signs for parts are the same as those of the counterparts having the same or similar functions in FIG. 1, In the present embodiment, the system comprises a third means 27 for generating a word probability distribution to a fifth means 31 for generating a word probability distribution; a means 33 for computing similarities, and a means 35 for generating an occurrence probability distribution. The third means 27 for generating a word probability distribution generates a probability distribution over words included in the lyric data of all of songs of the artist that have not been used in learning and for which an occurrence probability of background words are to be calculated (step ST302); a fourth means 29 for generating a word probability distribution generates probability distributions over words in the lyrics data of all of the songs of each of the artist that have been used in learning (step ST306); and a fifth means 31 for generating a word probability distribution generates a probability distribution for background words included in the lyrics data of all of songs for each of the artists that have been used in learning (step ST306). In the present embodiment, the word distribution over background words for each artist can be obtained by determining a word distribution over background words for each artist, not a common word probability over background words for all of the artists as illustrated in FIG. 11. The means 33 for computing similarities obtains cosine similarities or similarities according to an arbitrary scale respectively between the probability distribution over words included in the lyrics data of the new song s as calculated by the third means 27 for generating a word probability and the probability distributions over words included in the lyrics data of the plurality of songs as calculated by the fourth means 29 for generating word probability distributions (step ST307). The means 35 for generating an occurrence probability distribution over background words multiplies the respective probability distributions over background words included in the lyrics data of all of the songs of each of the artists as the fifth means 31 for generating an occurrence probability of words by the similarities for each of the artists as computed by the means 33 for computing similarities to obtain probability distributions, and normalizing the obtained probabilities such as the weights of the respective artists sum up to 1 (one). Thus, a resulting probability is determined as an occurrence probability of background words (step ST309). The determined occurrence probability is determined as the occurrence probability distribution over background words for a given artist. Also from the probability distribution over background words, meanings of the topics can be known.

[Example Results]

FIGS. 19A and 19B illustrate example word probability distributions for each of the topics obtained in the embodiments of the present invention; and FIG. 19C illustrates an example word probability distribution over background words for all of the songs. As known from the word probability distributions for each topic in FIG. 19A, the meaning of "positive" is specified for the topic 17 since there are words such as "Kimi (you)", "Yume (dream)", "Boku (I)", and "Ima (now)" having high occurrence probabilities. As known from the word probability distribution over words for each topic in FIG. 19B, the meaning of "Love song for adult women" is specified for the topic 19 since there are words such as "Anata (you)", "Watashi (I)", "Hito (person)", and "Koi (love)" having high occurrence probabilities. FIGS. 20A and 20B respectively illustrate an example occurrence probability distribution over background words of a song for each artist. FIG. 20A is an example occurrence probability distribution over background words in a song of an artist A; and FIG. 20B is an example occurrence probability distribution over background words in a song of an artist B. Looking at them, it is possible to obtain information on topic tendency of songs of artists from background words for each artist.

[Method and Computer Program]

The present invention may be implemented as a method for generating topic inference information of lyrics and a computer program therefor as follows, The method comprises:

(1) A step of obtaining a plurality of lyrics data each including a song name and lyrics for each of a plurality of artists;

a step of generating a given number of topic numbers k of 1 to K ($1 \leq k \leq K$);

an analysis step of analyzing the plurality of lyrics in the plurality of lyrics data by means of morpheme analysis to extract a plurality of words;

a step of learning topic numbers by first assigning the topic number k to the plurality of lyrics data for each of the plurality of artists in a random or arbitrary manner, then calculating a probability p that the topic number of a given lyrics data $S_{ar}$ is k, based on a number $R_{ak}$ of lyrics data other than a lyrics data $S_{ar}$ for a given artist a, to which the topic number k is assigned and a number $N_{kv}$ of times that the topic number k is assigned to the word v in the plurality of lyrics data of the plurality of artists except the given lyrics data $S_{ar}$, calculating a probability distribution over topic numbers of the given lyrics data $S_{ar}$, based on the calculated probability p, next performing an operation of updating topic numbers to update the topic number assigned to the given lyrics data $S_{ar}$ of the given artist a using a random number generator having a deviation of appearance probability corresponding to the probability distribution over topic numbers, and performing an operation of updating and learning topic numbers on all of the plurality of lyrics data of each of the plurality of artists for a predetermined number of times; and an outputting step of identifying the topic numbers of each of the plurality of lyrics data and the probability distributions over words for each of the topic numbers, based on learning results obtained in the step of learning topic numbers.

(2) The method for generating topic inference information of lyrics as described in (1) further comprises:

a step of learning values of switch variables, wherein a value of the switch variable is assigned to each of the plurality of words included in the plurality of lyrics data of each of the plurality of artists in a random or arbitrary manner; then a probability distribution $A_a$ over values of switch variables is generated by calculating a probability whether the value of the switch variable x assigned to the given word $v_{arj}$ is a topic word or a background word, based on values of switch variables assigned to the plurality of words in the plurality of lyrics data of the given artist a; next an operation of updating switch variables is performed to update the value of the switch variable assigned to the given word using a random number generator having a deviation of appearance probability corresponding to the probability distribution over values of the switch variables; and the operation of updating and learning values of switch variables, which performs the operation of updating values of switch variables on all of the plurality of words included in the plurality of lyrics data of each of the plurality of artists, is performed for a predetermined number of times.

(3) The method for generating topic inference information of lyrics as described in (1), wherein:

in the step of learning topic numbers, it is assumed that topic numbers assigned to all of the plurality of lyrics but the topic number assigned to the given lyrics data of the given artist are correct when generating the probability distribution over topic numbers.

(4) The method for generating topic inference information of lyrics as described in (2), wherein:

in the step of learning values of switch variables, it is assumed that values of switch variables assigned to all of words but the value of the switch variable x assigned to the given word in the plurality of words of the given lyrics data of the given artist are correct when performing the operation of updating switch variables.

(5) The method for generating topic inference information of lyrics as described in (1), wherein the step of learning topic numbers:

calculates a first probability $p_1$ that the topic number of the given lyrics data $S_{ar}$ is k, based on the number $R_{ak}$ of lyrics data other than the given lyrics data $S_{ar}$ of the given artist a when generating a probability distribution over topic numbers;

calculates a second probability $p_2$ that the topic number of the given lyrics data $S_{ar}$ is k, based on the number $N_{kv}$ of times that the topic number k is assigned to the word v in the plurality of lyrics data of the plurality of artists other than the given lyrics data $S_{ar}$;

calculates the probability p that the topic number of the given lyrics data $S_{ar}$ is k, from the first probability $p_1$ and the second probability $p_2$; and determines a probability distribution over topic numbers of the given lyrics data $S_{ar}$ by performing the above-identified calculations on all of the topic numbers and normalizing probabilities that the topic number of the given lyrics data $S_{ar}$ is any one of 1 to K such that normalized probabilities sum up to 1 (one).

(6) The method for generating topic inference information of lyrics as described in (1), wherein the outputting step is configured to output a probability distribution over words for each topic number, based on the number $N_{kv}$ of times that the topic number k is assigned to a given word v as used in the step of calculating the second probability $p_2$.

(7) The method for generating topic inference information of lyrics as described in (6), wherein:

in the outputting step, an occurrence probability $\theta_{kv}$ of a word v to which the topic number k is assigned is calculated as follows:

$$\theta_{kv}=(N_{kv}+\beta)/(N_k+\beta|V|)$$

where $N_{kv}$ denotes a number of times that a topic number k is assigned to a given word v, $N_k$ denotes a number of all of words to which the topic number k is assigned, $\beta$ denotes a smoothing parameter, and $|V|$ denotes a number of kinds of words.

(8) The method for generating topic inference information of lyrics as described in (2), wherein the step of learning values of switch variables:

calculates a third probability $p_3$ that the value of switch variable of the word $v_{arj}$ is 0 (zero), based on a number $N_{a0}$ of words to which a value of 0 (zero) is assigned as the value of the switch variable in all of lyric data of all of songs of the given artist a;

calculates a fourth probability $p_4$ that the value of the switch variable of the word $v_{arj}$ is 0 (zero), based on a number $Nz_{ar}v_{arj}$ of times that 0 (zero) is assigned to the value of the switch variable of the word $v_{an}$ in all of sons of all of artists to which the same topic number $Z_{ar}$ as the lyrics including the word $v_{arj}$ is assigned;

calculates a fifth probability $p_5$ that the value of the switch variable is 0 (zero) from the third probability $p_3$ and the fourth probability $p_4$;

calculates a sixth probability $p_6$ that the value of the switch variable of the word $v_{arj}$ is 1 (one), based on a number $N_{a1}$ of times that 1 (one) is assigned as the value of the switch variable in the plurality of lyrics data of the given artist;

calculates a seventh probability $p_7$ that the value of the switch variable of the word $v_{arj}$ is 1 (one), based on a number $N_{1varj}$ of times that 1 (one) is assigned as the value of the switch variable of the word $v_{arj}$ in the plurality of lyrics data of the plurality of artists;

calculates an eighth probability $p_8$ that the value of switch variable is 1 (one) from the sixth probability $p_6$ and the seventh probability $p_7$; and normalize the probabilities from the fifth probability $p_5$ and the eighth probability $p_8$ such that a sum of the probability that the value of the switch variable of the word $v_{arj}$ is 0 (zero) and the probability that the value of the switch variable of the word $v_{arj}$ is 1 (one) is 1 (one) to obtain a probability distribution over values of switch variables.

(9) The method for generating topic inference information of lyrics as described in (1), wherein:

the topic number of each of the plurality of lyrics data in the outputting means is a topic number that is last assigned to each of the plurality of lyrics data after the operation of updating and learning topic numbers is performed for a predetermined number of times in the step of learning topic numbers.

(10) The method for generating topic inference information of lyrics as described in (1) or (2), further comprises:

a first step of generating a word probability distribution over words included in lyrics data of a new song s of an artist that has not been used in learning;

a second step of generating a word probability distributions over words included respectively in lyrics data of the plurality of songs of the plurality of artists;

a step of computing similarities, respectively obtain similarities between the probability distribution of the words included in the lyrics data of the new song s as calculated by the first step of generating a word probability and the probability distributions over words included in the lyrics data of the plurality of songs as calculated by the second step of generating word probability distributions;

a step of generating a weight distribution by adding the similarities of the lyrics data of the plurality of songs corresponding to the lyrics data of the plurality of songs to the topic numbers as a weight; and a step of determining a topic number, determining a topic number having a largest weight as the topic number of the lyrics data of the new song s.

(11) The method for generating topic inference information of lyrics as described in (10), further comprises:

a third step of generating a word probability distribution over words included in the lyric data of all of songs of the artist that have not been used in learning and for which an occurrence probability of background words are to be calculated;

a fourth step of generating word probability distributions over words in the lyrics data of all of the songs of each of the artist;

a fifth step of generating a probability distribution over background words included in the lyrics data of all of songs of each of the artists;

a step of computing similarities, respectively obtaining similarities between the probability distribution over words included in the lyrics data of the new song s as calculated by the third step of generating a word probability and the probability distributions over words included in the lyrics data of the plurality of songs as calculated by the forth step of generating word probability distributions; and a step of generating an occurrence probability distribution over background words, multiplying the respective probability distributions over the background words included in the lyrics data of all of the songs of each of the artists as calculated by the fifth step of generating a word probability distribution by the similarities of each of the artists as computed by the step of computing similarities to obtain probability distributions, and normalizing the obtained probability distributions such that the weights for each of the artists sum up to 1 (one), and then determining a resulting probability distribution as the occurrence probability distribution over background words.

(12) A computer program for implementing the steps of the method for generating topic inference information of lyrics as described in any one of (1) to (11) using a computer.

(13) The computer program for generating topic inference information of lyrics as described in (12) is recorded in a computer-readable medium.

INDUSTRIAL APPLICABILITY

According to the present invention, once an arbitrary number of topics are determined, the respective topic numbers are identified for a plurality of lyrics data with the topic numbers for the lyrics data that are finally updated by the means of learning topic numbers. Once the topic number of each of the lyrics data is grasped, a word probability distribution can be known for each topic number. This accordingly eliminates the need of manually specifying a collection of words related to the topics and a collection of unrelated words. Further, once a plurality of words having a high occurrence probability are grasped, reliable information for determining the topics can be obtained from the thus grasped words, thereby obtaining likely meaning of the topic of each lyrics.

DESCRIPTION OF REFERENCE SIGNS 1, 101 System for generating topic inference information of lyrics
3, 103 Lyrics database
5, 1
05 Means for obtaining topic numbers
7, 107 Means for generating topic numbers
9, 109 Means for learning topic numbers
11, 111 Analysis means
13, 113 Outputting means
115 Means for learning values of switch variables

The invention claimed is:

1. A system for generating topic inference information of lyrics for obtaining reliable information for inferring a topic that is a subject, a main point or a theme of lyrics as determined by lyric contents, the system comprising:
a means for obtaining lyrics data, operable to obtain a plurality of lyrics data each including a song name and the lyrics of each of a plurality of artists;
a means for generating a given number of one or more topic numbers k ($1 \leq k \leq K$) where k is a number in a range of 1 to K (a positive integer);
an analysis means for extracting a plurality of words by performing morpheme analysis of a plurality of lyrics in the plurality of the lyrics data, using a morpheme analysis engine;
a means for learning the one or more topic numbers, operable to first assign a topic number to each of the plurality lyrics data of each of the plurality of artists in a random or arbitrary manner; then to calculate a probability p that the topic number of a given lyrics data $S_{ar}$ is k, based on a number $R_{ak}$ of lyrics data other than the lyrics data $S_{ar}$ of a given artist a, to which the topic number k is assigned and a number $N_{kv}$ of times that the topic number k is assigned to a word v in the plurality of lyrics data of the plurality of artists except the given lyrics data $S_{ar}$; to generate a probability distribution over the one or more topic numbers of the given lyrics data $S_{ar}$, based on the calculated probability p; next to perform an operation of updating the one or more topic numbers to update the topic number assigned to the given lyrics data $S_{ar}$ of the given artist a using a random number generator having a deviation of appearance probability corresponding to the probability distribution over the one or more topic numbers; and to perform an operation of updating and learning the one or more topic numbers for a predetermined number of times, the operation of updating and learning the one or more topic numbers performing the operation of updating the one or more topic numbers on all of the plurality of lyrics data of each of the plurality of artists;
a means for learning values of one or more switch variables, operable to assign values of the one or more switch variables to the plurality of words included in the plurality of lyrics data of each of the plurality of artists in a random or arbitrary manner; then to generate a probability distribution $\lambda_a$ over values of the one or more switch variables by calculating a probability whether the value of a switch variable x assigned to a given word $v_{arj}$ is a topic word or a background word, based on the values of the one or more switch variables assigned to the plurality of words in the plurality of lyrics data of the given artist a; next to perform an operation of updating values of the one or more switch variables to update the value of the switch variable assigned to the given word $v_{arj}$ using a random number generator having a deviation of appearance probability corresponding to the probability distribution over values of the one or more switch variables; and to perform an operation of updating and learning values of the one or more switch variables for a predetermined number of times, the operation of updating and learning values of the one or more switch variables performing the operation of updating values of the one or more switch variables on all of the plurality of words included in the plurality of lyrics data of each of the plurality of artists; and
an outputting means operable to identify the one or more topic numbers of each of the plurality of lyrics data and the probability distributions over words for each of the one or more topic numbers, based on learning results obtained from the means for learning the one or more topic numbers and learning results obtained by the means for learning values of the one or more switch variables;
wherein the means for generating the given number of the one or more topic numbers, the analysis means, the means for learning the one or more topic numbers, the means for learning values of the one or more switch variables and the outputting means are implemented on a computer by a computer program installed in the computer.

2. The system for generating topic inference information of lyrics according to claim 1, wherein:
in the means for learning the one or more topic numbers, it is assumed that the one or more topic numbers assigned to all of the plurality of lyrics but the topic number assigned to the given lyrics data of the given artist are correct when generating the probability distribution over the one or more topic numbers.

3. The system for generating topic inference information of lyrics according to claim 1, wherein:
in the means for learning values of the one or more switch variables, it is assumed that values of the one or more switch variables assigned to all of words but the value of the switch variable x assigned to a given word in the plurality of words of the given lyrics data of the given artist are correct when performing the operation of updating values of the one or more switch variables.

4. The system for generating topic inference information of lyrics according to claim 1, wherein the means for learning the one or more topic numbers:
calculates a first probability $p_1$ that the topic number of the given lyrics data $S_{ar}$ is k, based on the number $R_{ak}$ of lyrics data other than the given lyrics data $S_{ar}$ of the given artist a when generating the probability distribution over the one or more topic numbers;
calculates a second probability $p_2$ that the topic number of the given lyrics data $S_{ar}$ is k, based on the number $N_{kv}$ of times that the topic number k is assigned to the word v in the plurality of lyrics data of the plurality of artists other than the given lyrics data $S_{ar}$;
calculates the probability p that the topic number of the given lyrics data $S_{ar}$ is k, from the first probability $p_1$ and the second probability $p_2$; and
determines the probability distribution over the one or more topic numbers of the given lyrics data $S_{ar}$ by performing the above-identified calculations on all of the one or more topic numbers and normalizing probabilities that the topic number of the given lyrics data $S_{ar}$ is any one of 1 (one) to K such that normalized probabilities sum up to 1 (one).

5. The system for generating topic inference information of lyrics according to claim 1, wherein:
the outputting means is configured to output a probability distribution over words for each topic number, based on the number $N_{kv}$ of times that the topic number k is assigned to a given word v,
wherein the outputting means are implemented on the computer by the computer program installed in the computer.

6. The system for generating topic inference information of lyrics according to claim 5, wherein:
in the outputting means, an occurrence probability $\theta_{kv}$ of the word v to which the topic number k is assigned is calculated as follows:

$\theta_{kv}=(N_{kv}+\beta)/(N_k+\beta|V|)$ where $N_{kv}$ denotes a number of times that a topic number k is assigned to a given word v, $N_k$ denotes a number of all of words to which the topic number k is assigned, $\beta$ denotes a smoothing parameter, and $|V|$ denotes a number of kinds of words.

7. The system for generating topic inference information of lyrics according to claim 4, wherein the means for learning values of the one or more switch variables:
calculates a third probability $p_3$ that the value of the switch variable of the word $v_{arj}$ is 0 (zero), based on a number $N_{a0}$ of words to which a value of 0 (zero) is assigned as the value of switch variable in all of lyrics data of all of songs of the given artist a;
calculates a fourth probability $p_4$ that the value of the switch variable of the word $v_{arj}$ is 0 (zero), based on a number $Nz_{ar}v_{arj}$ of times that 0 (zero) is assigned to the value of the switch variable of the word $v_{arj}$ in all of songs of all of artists to which the same topic number $Z_{ar}$ as the lyrics including the word $v_{arj}$ is assigned;
calculates a fifth probability $p_5$ that the value of the switch variable is 0 (zero) from the third probability $p_3$ and the fourth probability $p_4$;
calculates a sixth probability $p_6$ that the value of the switch variable of the word $v_{arj}$ is 1 (one), based on a number $N_{a1}$ of times that 1 (one) is assigned as the value of the switch variable in the plurality lyrics data of the given artist;
calculates a seventh probability $p_7$ that the value of the switch variable of the word $v_{arj}$ is 1 (one), based on a number $N_{1varj}$ of times that 1 (one) is assigned as the value of the switch variable of the word $v_{arj}$ in the plurality of lyrics data of the plurality of artists;
calculates an eighth probability pa that the value of the switch variable is 1 (one) from the sixth probability $p_6$ and the seventh probability $p_7$; and
normalize the probabilities from the fifth probability $p_5$ and the eighth probability pa such that a sum of the probability that the value of the switch variable of the word $v_{arj}$ is 0 (zero) and the probability that the value of the switch variable of the word $v_{arj}$ is 1 (one) is 1 (one) to obtain a probability distribution over values of the one or more switch variables.

8. The system for generating topic inference information of lyrics according to claim 1, wherein:
the topic number for each of the plurality of lyrics data in the outputting means is a topic number that is last assigned to each of the plurality of lyrics data after the operation of updating and learning the one or more topic numbers is performed for a predetermined number of times in the means for learning the one or more topic numbers.

9. The system for generating topic inference information of lyrics according to claim 1, further comprising:
a first means for generating a first word probability distribution, operable to generate a probability distribution over words included in lyrics data of a new song s of an artist that has not been used in learning;
a second means for generating one or more second word probability distributions over words included respectively in lyrics data of the plurality of songs of the plurality of artists;
a means for computing similarities operable to respectively obtain similarities between the first word probability distribution over words included in the lyrics data of the new song s as calculated by the first means for generating the first word probability distribution and the one or more second word probability distributions over words respectively included in the lyrics data of the plurality of songs as calculated by the second means for generating the one or more second word probability distributions;
a means for generating a weight distribution by adding the similarities of the lyrics data of the plurality of songs corresponding to the lyrics data of the plurality of songs to the one or more topic numbers as a weight; and
a means for determining a topic number, operable to determine a topic number having a largest weight as a topic number of the lyrics data of the new song s.

10. The system for generating topic inference information of lyrics according to claim 9, further comprising:
a third means for generating a third word probability distribution, operable to generate the third word probability distribution over words included in the lyrics data of all of songs of the artist that have not been used in learning and for which an occurrence probability of background words are to be calculated;

a fourth means for generating one or more fourth word probability distributions, operable to generate probability distributions over words included in the lyrics data of all of the songs of each of the artists;

a fifth means for generating one or more fifth word probability distributions, operable to generate probability distributions over background words included in the lyrics data of all of songs for each of the artists;

a means for computing similarities, operable to obtain similarities respectively between the third word probability distribution over words included in the lyrics data of the new song s as calculated by the third means for generating the third word probability distribution and the one or more fourth word probability distributions over words included in the lyrics data of the plurality of songs as calculated by the fourth means for generating the one or more fourth word probability distributions; and a means for generating an occurrence probability distribution over background words, operable to multiply the respective probability distributions over background words included in the lyrics data of all of the songs of each of the artists as calculated by the fifth means for generating the one or more fifth word probability distributions, by the similarities for each of the artists as computed by the means for computing similarities to obtain probability distributions, and normalizing the obtained probability distributions such that the weights sum up to 1 (one) for the respective artists, and then determining a resulting probability distribution as an occurrence probability distribution over background words.

11. A system for generating topic inference information of lyrics for obtaining reliable information for inferring a topic that is a subject, a main point or a theme of lyrics as determined by lyric contents, the system comprising:

a means for obtaining lyrics data, operable to obtain a plurality of lyrics data each including a song name and the lyrics of each of a plurality of artists;

a means for generating a given number of one or more topic numbers k (1≤k≤K) where k is a number in a range of 1 to K (a positive integer);

an analysis means for extracting a plurality of words by performing morpheme analysis of a plurality of lyrics in the plurality of the lyrics data, using a morpheme analysis engine;

a means for learning the one or more topic numbers, operable to first assign a topic number to each of the plurality lyrics data of each of the plurality of artists in a random or arbitrary manner; then to calculate a probability p that the topic number of a given lyrics data $S_{ar}$ is k, based on a number $R_{ak}$ of lyrics data other than the lyrics data $S_{ar}$ of a given artist a, to which the topic number k is assigned and a number $N_{kv}$ of times that the topic number k is assigned to a word v in the plurality of lyrics data of the plurality of artists except the given lyrics data $S_{ar}$; to generate a probability distribution over the one or more topic numbers of the given lyrics data $S_{ar}$, based on the calculated probability p; next to perform an operation of updating the one or more topic numbers to update the topic number assigned to the given lyrics data $S_{ar}$ of the given artist a using a random number generator having a deviation of appearance probability corresponding to the probability distribution over the one or more topic numbers; and to perform an operation of updating and learning the one or more topic numbers for a predetermined number of times, the operation of updating and learning the one or more topic numbers performing the operation of updating the one or more topic numbers on all of the plurality of lyrics data of each of the plurality of artists; and an outputting means operable to identify the one or more topic numbers of each of the plurality of lyrics data and the probability distributions over words for each of the one or more topic numbers, based on learning results obtained from the means for learning the one or more topic numbers;

wherein the means for generating the given number of the one or more topic numbers, the analysis means, the means for learning the one or more topic numbers, and the outputting means are implemented on a computer by a computer program installed in the computer.

12. The system for generating topic inference information of lyrics according to claim 11, wherein:

in the means for learning the one or more topic numbers, it is assumed that the one or more topic numbers assigned to all of the plurality of lyrics but the topic number assigned to the given lyrics data of the given artist are correct when generating the probability distribution over the one or more topic numbers.

13. The system for generating topic inference information of lyrics according to claim 11, wherein the means for learning the one or more topic numbers:

calculates a first probability $p_1$ that the topic number of the given lyrics data $S_{ar}$ is k, based on the number $R_{ak}$ of lyrics data other than the given lyrics data $S_{ar}$ of the given artist a when generating the probability distribution over the one or more topic numbers;

calculates a second probability $p_2$ that the topic number of the given lyrics data $S_{ar}$ is k, based on the number $N_{kv}$ of times that the topic number k is assigned to the word v in the plurality of lyrics data of the plurality of artists other than the given lyrics data $S_{ar}$;

calculates the probability p that the topic number of the given lyrics data $S_{ar}$ is k, from the first probability $p_1$ and the second probability $p_2$; and determines the probability distribution over the one or more topic numbers of the given lyrics data $S_{ar}$ by performing the above-identified calculations on all of the one or more topic numbers and normalizing probabilities that the topic number of the given lyrics data $S_{ar}$ is any one of 1 (one) to K such that normalized probabilities sum up to 1 (one).

14. The system for generating topic inference information of lyrics according to claim 13, wherein:

the outputting means is configured to output a probability distribution over words for each topic number, based on the number $N_{kv}$ of times that the topic number k is assigned to a given word v, wherein the outputting means are implemented on the computer by the computer program installed in the computer.

15. The system for generating topic inference information of lyrics according to claim 14, wherein:

in the outputting means, an occurrence probability $\theta_{kv}$ of the word v to which the topic number k is assigned is calculated as follows:

$$\theta_{kv} = (N_{kv} + \beta)/(N_k + \beta|V|)$$

where $N_{kv}$ denotes a number of times that a topic number k is assigned to a given word v, $N_k$ denotes a number of all of words to which the topic number k is assigned, β denotes a smoothing parameter, and |V| denotes a number of kinds of words.

16. The system for generating topic inference information of lyrics according to claim 11, further comprising:
a first means for generating a first word probability distribution, operable to generate a probability distribution over words included in lyrics data of a new song s of an artist that has not been used in learning;
a second means for generating one or more second word probability distributions over words included respectively in lyrics data of the plurality of songs of the plurality of artists;
a means for computing similarities, operable to obtain similarities respectively between the probability distribution over words included in the lyrics data of the new song s as calculated by the first means for generating the first word probability distribution and the probability distributions over words included in the lyrics data of the plurality of songs as calculated by the second means for generating the one or more second word probability distributions;
a means for generating a weight distribution by adding the similarities of the lyrics data of the plurality of songs corresponding to the lyrics data of the plurality of songs to the one or more topic numbers as a weight; and
a means for determining a topic number, operable to determine a topic number having a largest weight as a topic number of the lyrics data of the new song s.

* * * * *